(12) United States Patent
Manson et al.

(10) Patent No.: US 12,168,517 B2
(45) Date of Patent: Dec. 17, 2024

(54) AIRCRAFT SEAT ASSEMBLY

(71) Applicant: RECARO Aircraft Seating GmbH & Co. KG, Schwäbisch Hall (DE)

(72) Inventors: Tim Manson, Wembley (GB); Christophe Ducreux, Aix-en-Provence (FR)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 133 days.

(21) Appl. No.: 17/914,106

(22) PCT Filed: Mar. 18, 2021

(86) PCT No.: PCT/EP2021/057017
§ 371 (c)(1),
(2) Date: Sep. 23, 2022

(87) PCT Pub. No.: WO2021/191056
PCT Pub. Date: Sep. 30, 2021

(65) Prior Publication Data
US 2023/0257123 A1 Aug. 17, 2023

(30) Foreign Application Priority Data
Mar. 26, 2020 (DE) ...................... 10 2020 108 436.6

(51) Int. Cl.
*B64D 11/06* (2006.01)
(52) U.S. Cl.
CPC ...... *B64D 11/0641* (2014.12); *B64D 11/0601* (2014.12); *B64D 11/0604* (2014.12)
(58) Field of Classification Search
CPC ............ B64D 11/0641; B64D 11/0601; B64D 11/0604; B64D 11/0606; B64D 11/0646;
(Continued)

(56) References Cited

U.S. PATENT DOCUMENTS 7,913,951 B2* 3/2011 Barroca .................. F16D 11/12
244/118.6
8,172,321 B2* 5/2012 Hankinson ............. B64D 11/00
244/118.6
(Continued)

FOREIGN PATENT DOCUMENTS

DE 603 03 905 T2 11/2003
EP 1 364 874 A1 11/2003
(Continued)

OTHER PUBLICATIONS

Office Action dated Jul. 27, 2023 issued in corresponding European Patent Application No. 21715493.9 (and English translation).
(Continued)

*Primary Examiner* — Medhat Badawi
(74) *Attorney, Agent, or Firm* — Posz Law Group, PLC

(57) ABSTRACT

The invention relates to an aircraft seat assembly (14a; 14b; 14c; 14d) comprising at least one aircraft seat device (46a; 46b; 46c; 46d) and at least one additional aircraft seat device (48a; 48b; 48c; 48d) which are arranged at least partly next to one another in at least one common column of seats (36a; 36b; 36c; 36d) and each of which can be adjusted between a sitting position and a lying position. According to the invention, the lying direction (64a; 64b; 64c; 64d) of the at least one aircraft seat device (46a; 46b; 46c; 46d) is oriented in the opposite direction to another lying direction (96a; 96b; 96c; 96d) of the at least one other aircraft seat device (48a; 48b; 48c; 48d).

22 Claims, 13 Drawing Sheets

(58) Field of Classification Search
CPC ............ B64D 11/0639; B64D 11/0602; B64D 11/0605; Y02T 50/40

See application file for complete search history.

(56) References Cited

U.S. PATENT DOCUMENTS

| | | | | |
|---|---|---|---|---|
| 8,348,195 | B2* | 1/2013 | Ersan | B64D 11/06 244/118.6 |
| 8,690,254 | B2* | 4/2014 | Cailleteau | B64D 11/0646 244/118.6 |
| 8,864,071 | B2* | 10/2014 | Vergnaud | B64D 11/0643 297/65 |
| 8,882,036 | B2* | 11/2014 | Henshaw | B64D 11/0601 244/118.6 |
| 8,991,756 | B2* | 3/2015 | Papke | B64D 11/00 244/118.6 |
| 9,527,592 | B2* | 12/2016 | Ducreux | B64D 11/0604 |
| 9,856,025 | B2* | 1/2018 | Jasny | B64D 11/0647 |
| 9,868,531 | B2* | 1/2018 | Kircher | B64D 11/0601 |
| 10,494,102 | B2* | 12/2019 | Ducreux | B64D 11/0606 |
| 10,615,183 | B2* | 4/2020 | Chang | H01L 23/544 |
| 10,730,627 | B2* | 8/2020 | Ducreux | B64D 11/0644 |
| 11,260,975 | B2* | 3/2022 | Lorsignol | B64D 11/0601 |
| 11,319,072 | B2* | 5/2022 | Henshaw | B64D 11/0601 |
| 11,679,880 | B2* | 6/2023 | Lee | B64D 11/0606 244/118.6 |
| 11,679,881 | B2* | 6/2023 | White | B64D 11/0605 244/118.6 |
| 11,708,163 | B2* | 7/2023 | Johnson | B64D 11/0606 244/118.6 |
| 2003/0218095 | A1* | 11/2003 | Saint Jalmes | B64D 11/00 244/118.5 |
| 2010/0308164 | A1* | 12/2010 | McKeever | B64D 11/0641 244/118.6 |
| 2011/0210204 | A1* | 9/2011 | Collins | B64D 11/0643 244/118.6 |
| 2012/0223186 | A1* | 9/2012 | Henshaw | B64D 11/0601 244/118.6 |
| 2014/0283296 | A1* | 9/2014 | Jerome | B64D 11/0604 5/12.1 |
| 2014/0306500 | A1* | 10/2014 | Dryburgh | B64D 11/0601 297/232 |
| 2015/0069805 | A1* | 3/2015 | Henshaw | B64D 11/0606 297/244 |
| 2015/0166182 | A1* | 6/2015 | Ducreux | B64D 11/06 244/118.6 |
| 2015/0166183 | A1* | 6/2015 | Henshaw | B64D 11/064 244/118.6 |
| 2015/0166184 | A1* | 6/2015 | Dryburgh | B64D 11/0604 244/118.6 |
| 2015/0298812 | A1* | 10/2015 | Jasny | B60N 2/01 297/344.21 |
| 2015/0329208 | A1* | 11/2015 | Eakins | G06F 30/15 703/1 |
| 2016/0122022 | A1* | 5/2016 | Cooke | B64D 11/0696 244/118.6 |
| 2016/0272323 | A1* | 9/2016 | Carlioz | B64D 11/0606 |
| 2018/0127099 | A1* | 5/2018 | Ducreux | B64D 11/0604 |
| 2018/0297708 | A1* | 10/2018 | Ducreux | B60N 3/002 |
| 2019/0193616 | A1* | 6/2019 | Cansfield | B64D 11/0601 |
| 2019/0248497 | A1* | 8/2019 | Ersan | B64D 11/0602 |
| 2019/0300177 | A1* | 10/2019 | Nicholas | B64D 11/0604 |
| 2019/0315467 | A1* | 10/2019 | Nicholas | B64D 11/0602 |
| 2019/0315468 | A1* | 10/2019 | White | B64D 11/0605 |
| 2020/0062403 | A1* | 2/2020 | Williams | B64D 11/0602 |
| 2020/0307797 | A1* | 10/2020 | Henshaw | B64D 11/0606 |
| 2021/0188441 | A1* | 6/2021 | Lee | B64D 11/0601 |
| 2021/0197973 | A1* | 7/2021 | Katakura | B64D 11/0636 |
| 2021/0276716 | A1* | 9/2021 | Nicholas | B64D 11/0606 |
| 2021/0380254 | A1* | 12/2021 | Woodington | B64D 11/0607 |
| 2022/0161929 | A1* | 5/2022 | Katakura | B64D 11/00151 |
| 2022/0332420 | A1* | 10/2022 | Miedema | B64D 11/0601 |
| 2023/0002056 | A1* | 1/2023 | Rousse | B64D 11/0601 |
| 2023/0182903 | A1* | 6/2023 | Manson | B64D 11/0601 244/118.6 |
| 2023/0257123 | A1* | 8/2023 | Manson | B64D 11/0641 244/118.5 |

FOREIGN PATENT DOCUMENTS

| | | |
|---|---|---|
| EP | 2 944 571 A1 | 11/2015 |
| EP | 3 718 892 A1 | 10/2020 |
| WO | 2010/018367 A2 | 2/2010 |
| WO | 2014/006607 A2 | 1/2014 |
| WO | 2014/049362 A1 | 4/2014 |
| WO | 2018/078375 A1 | 5/2018 |
| WO | 2018/078376 A1 | 5/2018 |

OTHER PUBLICATIONS

German Search Report dated Mar. 12, 2021 issued in corresponding German Patent Application DE 10 2020 108 436.6 (and partial English translation).

International Search Report of the International Searching Authority mailed Jun. 9, 2021 in corresponding international application No. PCT/EP2021/057017 (English Translation Only).

International Preliminary Report of Patentablility of the International Searching Authority mailed Sep. 22, 2022 in corresponding international application No. PCT/EP2021/057017 (English Translation Only).

Office Action mailed May 23, 2024 in corresponding European Patent Application No. 21 715 493.9 (and English translation).

\* cited by examiner

AIRCRAFT SEAT ASSEMBLY

CROSS REFERENCE TO RELATED APPLICATIONS

This application is a U.S. national stage application of PCT/EP2021/057017 filed on Mar. 18, 2021, which is based on and claims the benefit of priority of the prior German Patent Application No. 10 2020 108 436.6 filed on Mar. 26, 2020, the contents of which are incorporated herein by reference.

PRIOR ART

The invention relates to an aircraft seat assembly.

An aircraft seat assembly having at least one aircraft seat device and having at least one further aircraft seat device, which are disposed so as to be at least partially next to one another in at least one common seat column and which are in each case adjustable between a sitting position and a lying position, has already been proposed.

The object of the invention preferably lies in providing a device of the generic type with improved characteristics in terms of compact design and comfort. The object is achieved according to the invention by the features of the independent claim, while advantageous design embodiments and refinements of the invention can be derived from the dependent claims.

Advantages of the Invention

The invention proceeds from an aircraft seat assembly having at least one aircraft seat device and having at least one further aircraft seat device, which are disposed so as to be at least partially next to one another in at least one common seat column and which are in each case adjustable between a sitting position and a lying position.

It is proposed that a lying direction of the at least one aircraft seat device is aligned so as to be counter to a further lying direction of the at least one further aircraft seat device. An advantageously compact and comfortable arrangement of the at least one aircraft seat device and of the at least one further aircraft seat device can be achieved as a result of a design embodiment according to the invention. Furthermore, the at least one aircraft seat device and the at least one further aircraft seat device can be mutually positioned in a particularly advantageous manner as a result of the design embodiment according to the invention. As a result, an available space in an aircraft cabin can be utilized in an advantageously efficient manner. The aircraft seat assembly is preferably provided for use in an aircraft cabin of an aircraft. The aircraft cabin is preferably specified for accommodating all passengers during a flight, preferably independently of a booked seat class. A seat class is configured, for example, as an economy class, as a premium economy class, as a business class or as a first class. The aircraft cabin, preferably along an aircraft longitudinal axis, preferably has at least one aircraft cabin portion. The aircraft seat assembly is particularly preferably disposed in the at least one aircraft cabin portion. The at least one aircraft cabin portion along an aircraft longitudinal axis is preferably delimited by at least one partition element, preferably a partition wall or a curtain, and/or by at least one aircraft cabin module, preferably a galley module or a washroom module. A seat class can preferably be disposed in a plurality of aircraft cabin portions. The aircraft cabin preferably has an aircraft cabin central axis. The aircraft cabin central axis preferably has identical spacings from each of the mutually opposite aircraft cabin external walls of the aircraft cabin. The aircraft cabin central axis is preferably aligned so as to be parallel to a rolling axis of the aircraft. The aircraft cabin central axis is preferably aligned so as to be parallel to an aircraft cabin floor of the aircraft cabin. An "aircraft longitudinal axis" is preferably to be understood to be an axis which extends in the direction of a largest extent of the aircraft cabin and is disposed within the aircraft cabin. The aircraft longitudinal axis here is preferably aligned so as to be parallel to the aircraft cabin central axis. The aircraft in at least one operating state preferably has a flight direction. The flight direction, preferably in an ideal operating state, is preferably aligned so as to be parallel to the aircraft cabin central axis and/or to an aircraft longitudinal axis. The aircraft cabin preferably has at least one aircraft cabin aisle. The at least one aircraft cabin aisle preferably extends at least substantially along an aircraft longitudinal axis. The at least one aircraft seat device and the at least one further aircraft seat device are preferably provided to be mounted on the aircraft cabin floor of the aircraft cabin. "Provided" is preferably to be understood to mean especially conceived and/or equipped. An object being provided for a specific function is preferably to be understood to mean that the object fulfils and/or carries out this specific function in at least one state of application and/or operation. A "seat column" is preferably to be understood to mean a region in the aircraft cabin in which a plurality of aircraft seat devices are disposed behind one another, when viewed along an aircraft longitudinal axis, wherein the region is delimited by an aircraft cabin aisle and by a further aircraft cabin aisle, or by an aircraft cabin external wall of the aircraft cabin. The at least one seat column preferably extends in the flight direction. The at least one aircraft seat device and the at least one further aircraft seat device are preferably disposed so as to be at least partially next to one another in the at least one common seat column. Particularly preferably, exactly two aircraft seat devices are disposed so as to be directly next to one another in the at least one common seat column, specifically the at least one aircraft seat device and the at least one further aircraft seat device. The at least one aircraft seat device and the at least one further aircraft seat device, preferably in a single seat column, when viewed orthogonally to the aircraft longitudinal axis, are preferably disposed so as to at least partially overlap one another. "Disposed next to one another" is preferably to be understood to mean that an axis, which is aligned so as to be parallel to the aircraft cabin floor and perpendicular to an aircraft longitudinal axis, intersects the at least one aircraft seat device and the at least one further aircraft seat device. The at least one aircraft seat device and the at least one further aircraft seat device are particularly preferably disposed in the at least one seat column so as to be directly mutually adjacent. The at least one aircraft seat device preferably configures an aircraft seat region, and the at least one further aircraft seat device configures a further aircraft seat region. An "aircraft seat region" here is preferably to be understood to mean a region which is personally available to a passenger in the aircraft cabin, preferably while the passenger uses the at least one aircraft seat device, wherein preferably all parts of the at least one aircraft seat device are disposed in the aircraft seat region. The at least one aircraft seat device preferably has an aircraft seat. The aircraft seat is preferably envisaged for providing a seat for a passenger in the aircraft. The aircraft seat particularly preferably comprises a seat base and a backrest. The aircraft seat preferably comprises at least one armrest. Additionally, it would be conceivable for the aircraft seat to comprise a leg rest. In principle, the aircraft seat can comprise further add-on parts such as preferably a headrest. The aircraft seat is preferably adjustable, preferably electromechanically, between a sitting position and a lying position. The aircraft seat device preferably comprises at least one adjustment unit which is provided for adjusting the aircraft seat between the sitting position and the lying position. The at least one aircraft seat device preferably has at least one enclosure. The at least one enclosure is preferably configured as a shell element. The at least one aircraft seat device preferably has at least one console. The at least one aircraft seat device preferably has at least one ottoman. The at least one aircraft seat device preferably has at least one table unit. The at least one aircraft seat device preferably has at least one partition unit which is provided for partitioning, preferably visually, the aircraft seat region from an aircraft cabin aisle and/or from an adjacent aircraft seat region. The at least one further aircraft seat device preferably has a further aircraft seat. The further aircraft seat is preferably envisaged for providing a further seat to a further passenger in the aircraft. The further aircraft seat particularly preferably comprises a further seat base and a further backrest. The further aircraft seat preferably comprises at least one further armrest. It would additionally be conceivable for the further aircraft seat to comprise a further leg rest. In principle, the further aircraft seat can comprise further add-on parts such as preferably a further headrest. In principle, the aircraft seat and the further aircraft seat can be of identical configuration. The further aircraft seat is preferably adjustable, preferably electromechanically, between a further sitting position and a further lying position. The further aircraft seat device preferably comprises at least one further adjustment unit which is provided for adjusting the further aircraft seat between the sitting position and the lying position. The at least one aircraft seat device preferably has at least one further enclosure. The at least one further enclosure is preferably configured as a shell element. The at least one further aircraft seat device preferably has at least one further console. The at least one further aircraft seat device preferably has at least one further ottoman. The at least one further aircraft seat device preferably has at least one further table unit. The at least one further aircraft seat device preferably has at least one further partition unit which is provided for partitioning, preferably visually, the further aircraft seat region from an aircraft cabin aisle and/or from an adjacent aircraft seat region. A "sitting position" is preferably to be understood to mean a position of the aircraft seat at which a passenger can sit upright on the aircraft seat. The backrest of the aircraft seat and the seat base of the aircraft seat in the sitting position are preferably substantially perpendicular to one another, preferably at an angle between 90 degrees and 115 degrees. The sitting position preferably configures a first terminal position of the aircraft seat to which the aircraft seat is adjustable to the maximum. The sitting position is preferably configured as a TTL position. A "TTL position" is preferably to be understood to mean an upright position of the aircraft seat which for safety reasons has preferably to be assumed in a taxiing phase, a takeoff phase and a landing phase of the aircraft. The at least one aircraft seat device preferably has a sitting direction. The at least one further aircraft seat device preferably has a further sitting direction. The sitting direction of the at least one aircraft seat device is particularly preferably aligned so as to be counter to the further sitting direction of the at least one further aircraft seat device. A "sitting direction" is preferably to be understood to mean a direction which is aligned so as to be at least substantially parallel to the aircraft cabin floor, preferably with a deviation of 3 degrees to the aircraft cabin floor, and aligned so as to be at least substantially perpendicular to a theoretical, flat backrest which is aligned so as to be perpendicular to the aircraft cabin floor, wherein the direction corresponds to a normal on a front side of the backrest, wherein the front side of the backrest configures a support face for a back of a passenger in a customary sitting position. "At least substantially" is preferably to be understood to mean that a deviation from a predefined value is preferably less than 25%, preferably less than 10%, and particularly preferably less than 5% of the predefined value. A "lying position" is preferably to be understood to mean a position of the aircraft seat which is envisaged for providing an at least substantially horizontal bed surface to a passenger, preferably such that the passenger can assume a sleeping posture during a flight. The passenger in the lying position of the aircraft seat preferably lies at least substantially on the aircraft seat, preferably on the seat base and on the backrest. The lying position preferably configures a second terminal position of the aircraft seat to which the aircraft seat is adjustable to the maximum. A "lying direction" is preferably to be understood to mean a direction which runs at least substantially parallel to the aircraft cabin floor, preferably with a deviation of 3 degrees to the aircraft cabin floor, and in the lying position runs along a common central axis of the backrest and of the seat base. The lying direction is preferably directed from a head of a passenger to at least one foot of the passenger. When viewed in the lying direction, the head of the passenger is preferably disposed behind the at least one foot of the passenger, preferably in a customary sleeping posture of the passenger. An element being disposed "behind" a further element in a direction is preferably to be understood to mean that, when viewed in the direction, the further element is disposed first and thereafter the element. An element being disposed "in front of" a further element in a direction is preferably to be understood to mean that, when viewed in the direction, the element is disposed first and thereafter the further element. The lying direction preferably extends along a seat central axis of the aircraft seat of the at least one aircraft seat device. The lying direction particularly preferably extends along a spinal column of the passenger that in an idealized manner is straight. The lying direction is particularly preferably defined by the aircraft seat of the at least one aircraft seat device and preferably not by an actual posture of a passenger lying in the lying position on the aircraft seat. The lying direction of the at least one aircraft seat device is preferably configured so as to be at least substantially parallel to the further lying direction of the at least one further aircraft seat device. The sitting direction of the at least one aircraft seat device is preferably configured so as to be at least substantially parallel to the further sitting direction of the at least one further aircraft seat device. The sitting direction preferably corresponds to the lying direction. The further sitting direction preferably corresponds to the further lying direction. In principle, further positions which preferably configure a combined sitting and lying position can be provided between the sitting position and the lying position. The aforementioned definitions pertaining to the sitting position, the sitting direction, the lying position and the lying direction preferably also apply to the at least one further aircraft seat device. The aircraft seat and the further aircraft seat are preferably configured in each case as a fully-flat seat. A "fully-flat seat" is preferably to be understood to mean an aircraft seat which can be transferred from the sitting position to the lying position and in the lying position configures an at least substantially flat bed surface.

The flat bed surface is preferably inclined at an angle of 3 degrees in relation to the aircraft cabin floor. At least the seat base of the aircraft seat and the backrest of the aircraft seat in the lying position are particularly preferably aligned so as to be at least substantially parallel to the aircraft cabin floor on which the aircraft seat is mounted. The seat base of the aircraft seat and the backrest of the aircraft seat in the lying position preferably have a common support face which is aligned so as to be at least substantially parallel to the aircraft cabin floor.

It is furthermore proposed that the at least one aircraft seat device and the at least one further aircraft seat device have in each case direct access to an aircraft cabin aisle. As a result of this design embodiment, an advantageously easy and comfortable access to an aircraft seat can be achieved. As a result, a particularly advantageously high level of comfort for a passenger can be achieved. Furthermore, as a result of this design embodiment, an advantageously high level of comfort for the passenger can be achieved because passengers from adjacent aircraft seat regions are not disturbed and/or impeded by direct access to an aircraft cabin aisle. "Direct access" is preferably to be understood to mean access from an aircraft cabin aisle to an aircraft seat region, preferably to an aircraft seat, wherein the access to the aircraft seat region, preferably to the aircraft seat, is not routed through an adjacent aircraft seat region. The passenger can particularly preferably enter the aircraft seat region directly from the aircraft cabin aisle, preferably without traversing any further aircraft seat region. The direct access is preferably assigned to only a single aircraft seat device. The direct access is preferably able to be used only by a single aircraft seat device.

It is furthermore proposed that the at least one aircraft seat device and the at least one further aircraft seat device have in each case direct access to different aircraft cabin aisles. As a result of this design embodiment, an advantageously uniform distribution of direct accesses within the aircraft cabin can be achieved. As a result, an advantageously uniform utilization of the different aircraft cabin aisles is achieved, as a result of which an advantageously high level of comfort for a passenger is achieved. The aircraft cabin preferably has two aircraft cabin aisles which are preferably mutually spaced apart by at least one seat column. The at least one aircraft seat device preferably has direct access to a first aircraft cabin aisle of the two aircraft cabin aisles. The at least one further aircraft seat device preferably has direct access to a second aircraft cabin aisle of the two aircraft cabin aisles.

It is moreover proposed that the lying direction of the at least one aircraft seat device has a directional component in the flight direction, and the further lying direction of the at least one further aircraft seat device has a directional component counter to the flight direction. An advantageously compact aircraft seat assembly can be provided by this design embodiment. Furthermore, an advantageously high level of privacy can be achieved as a result of this design embodiment, as a result of which an advantageously high level of comfort is made possible. A "directional component" is preferably to be understood to mean a component of a vector of the lying direction and/or of the sitting direction that is aligned so as to be parallel to the flight direction. Alternatively, it would also be conceivable that the lying direction of the at least one aircraft seat device has a directional component counter to the flight direction, and the further lying direction of the at least one further aircraft seat device has a directional component in the flight direction.

It is furthermore proposed that the lying direction of the at least one aircraft seat device and the further lying direction of the at least one further aircraft seat device are aligned so as to be angled, in particular by at least 5 degrees, in relation to an aircraft longitudinal axis. When viewed in the flight direction, the at least one aircraft seat device and the at least one further aircraft seat device can be disposed in an advantageously dense manner as a result of this design embodiment. As a result, an advantageously high number of aircraft seat devices can be provided in the aircraft cabin portion. The lying direction of the at least one aircraft seat device is preferably aligned so as to be angled preferably by at least 5 degrees, preferably by at least 30 degrees, and particularly preferably by at least 45 degrees, in relation to an aircraft longitudinal axis. The further lying direction of the at least one further aircraft seat device is preferably aligned so as to be angled preferably by at least 5 degrees, preferably by at least 30 degrees, and particularly preferably by at least 45 degrees, in relation to an aircraft longitudinal axis. The lying direction of the at least one aircraft seat device and the further lying direction of the at least one further aircraft seat device are particularly preferably angled in relation to an aircraft longitudinal axis by angles of identical values. The sitting direction of the at least one aircraft seat device and the further sitting direction of the at least one further aircraft seat device are particularly preferably aligned so as to be angled, in particular by at least 5 degrees, in relation to an aircraft longitudinal axis. The sitting direction of the at least one aircraft seat device is preferably aligned so as to be angled preferably by at least 5 degrees, preferably by at least 30 degrees, and particularly preferably by at least 45 degrees, in relation to an aircraft longitudinal axis. The further sitting direction of the at least one further aircraft seat device is preferably aligned so as to be angled preferably by at least 5 degrees, preferably by at least 30 degrees, and particularly preferably by at least 45 degrees, in relation to an aircraft longitudinal axis. The sitting direction of the at least one aircraft seat device and the further sitting direction of the at least one further aircraft seat device are particularly preferably angled in relation to an aircraft longitudinal axis by angles of identical values.

It is furthermore proposed that the lying direction of the at least one aircraft seat device and the further lying direction of the at least one further aircraft seat device are aligned so as to be at least substantially parallel. An advantageously compact aircraft seat assembly can be provided as a result of this design embodiment. Furthermore, an advantageously uniform visual impact of the aircraft seat assembly can be achieved as a result of this design embodiment. The lying direction and the further lying direction are preferably aligned in an idealized manner to the at least one aircraft seat device and the at least one further aircraft seat device, wherein an actual lying direction defined by a passenger, preferably by virtue of an asymmetrical posture of the passenger, may deviate from the lying direction and from the further lying direction.

It is moreover proposed that the at least one aircraft seat device at least partially intersects an aircraft cabin central plane. An advantageously compact aircraft seat assembly can be provided as a result of this design embodiment. Furthermore, any excess length and/or free space owing to a disposal of the at least one aircraft seat device and/or of the at least one further aircraft seat device can advantageously be used in a space-efficient manner as a result. An "aircraft cabin central plane" is preferably to be understood to mean a plane which is aligned perpendicularly to the aircraft cabin floor along the aircraft cabin central axis. An external contour of the at least one aircraft seat device that is projected onto the aircraft cabin floor advantageously at least partially intersects the aircraft cabin central plane. The projected external contour of the at least one aircraft seat device preferably has a shape which is configured so as to correspond to an external contour of at least one adjacent aircraft seat device, said external contour by way of an aircraft longitudinal axis being configured as a mirror image.

It is furthermore proposed that the aircraft seat assembly comprises at least three seat groups which are disposed directly behind one another in the at least one seat column and are in each case formed from the at least one aircraft seat device and the at least one further aircraft seat device. An advantageously cost-effective production of the at least one aircraft seat device and of the at least one further aircraft seat device can be achieved as a result of this design embodiment, wherein a diversity of components can advantageously be kept to a minimum. Furthermore, a variable number of seat groups can advantageously be disposed along an aircraft longitudinal axis as a result of this design embodiment. As a result, the aircraft seat assembly can be implemented in an advantageously simple manner in aircraft cabins of different designs. A "seat group" is preferably to be understood to mean a common assembly of the at least one aircraft seat device and of the at least one further aircraft seat device in one region of the aircraft cabin, preferably in the aircraft cabin portion. The at least one aircraft seat device and the at least one further aircraft seat device are preferably disposed directly behind one another and/or directly next to one another in the at least one seat column. The at least one aircraft seat device and the at least one further aircraft seat device preferably configure one of the at least three seat groups. The at least three seat groups which are disposed directly behind one another in the at least one seat column are particularly preferably of identical configuration. The at least three seat groups preferably configure a, preferably periodically, repeatable sequence. A plurality of identical seat groups here can be disposed directly behind one another, preferably along an aircraft longitudinal axis.

It is furthermore proposed that an axis perpendicular to an aircraft longitudinal axis, in particular in the lying position of the at least one aircraft seat device and of the at least one further aircraft seat device, intersects a shoulder region of the at least one aircraft seat device and a further shoulder region of the at least one further aircraft seat device. An advantageously compact mutual disposal of the at least one aircraft seat assembly and of the at least one further aircraft seat assembly can be achieved as a result of this design embodiment. Furthermore, an advantageously high level of privacy can be achieved as a result of this design embodiment, as a result of which an advantageously high level of comfort is made possible. The axis is preferably aligned so as to be parallel to the aircraft cabin floor. The axis preferably intersects exactly two shoulder regions in a single seat column. A "shoulder region" is preferably to be understood to mean a region of an aircraft seat device in which a shoulder of a passenger, the latter preferably corresponding to the $95^{th}$ percentile, is disposed preferably in a customary sleeping posture in the lying position of the at least one aircraft seat device, wherein a head of the passenger in the lying position is preferably disposed in a region of an upper edge of the backrest of the aircraft seat, wherein the upper edge is preferably situated on a side of the backrest that faces away from the seat base of the aircraft seat. The shoulder region of the at least one aircraft seat device is preferably provided for receiving the shoulder of the passenger, the latter preferably corresponding to the $95^{th}$ percentile, in the lying position of the at least one aircraft seat device. The at least one aircraft seat device and the at least one further aircraft seat device preferably have in each case direct access to one and the same aircraft cabin aisle. The lying direction of the at least one aircraft seat device is preferably directed away from an aircraft cabin aisle. The further lying direction of the at least one further aircraft seat device is preferably directed toward the aircraft cabin aisle.

It is moreover proposed that an axis perpendicular to an aircraft longitudinal axis, in particular in the sitting position of the at least one aircraft seat device and of the at least one further aircraft seat device, intersects the backrest of the aircraft seat of the at least one aircraft seat device and the further backrest of the further aircraft seat of the at least one further aircraft seat device. An advantageously compact mutual disposal of the at least one aircraft seat assembly and of the at least one further aircraft seat assembly can be achieved as a result of this design embodiment. Furthermore, an advantageously high level of privacy can be achieved as a result of this design embodiment, as a result of which an advantageously high level of comfort is made possible. The axis is preferably aligned so as to be parallel to the aircraft cabin floor. Exactly two backrests are preferably disposed next to one another in the at least one common seat column, specifically the backrest of the aircraft seat of the at least one aircraft seat device and the further backrest of the further aircraft seat of the at least one further aircraft seat device.

It is furthermore proposed that the at least one aircraft seat device has at least one enclosure which in the lying position of the at least one aircraft seat device at least substantially covers a head region of the aircraft seat of the at least one aircraft seat device. A particularly comfortable aircraft seat assembly can be provided as a result of this design embodiment. It can furthermore be advantageously achieved as a result of this design embodiment that the aircraft seat of the at least one aircraft seat device is shielded from an environment. A visual shield can preferably be achieved as a result, as a result of which an advantageously high level of privacy is made possible. Furthermore, an advantageously compact aircraft seat assembly can be simultaneously achieved as a result of this design embodiment. The head of the passenger in the lying position is preferably disposed in the head region, wherein the passenger preferably corresponds to the $95^{th}$ percentile. The head region is preferably situated on the upper edge of the backrest of the aircraft seat, wherein the upper edge is preferably situated on a side of the backrest that faces away from the seat base of the aircraft seat. An axis which, preferably in the lying position, is aligned so as to be perpendicular to the aircraft cabin floor preferably intersects the at least one enclosure of the at least one aircraft seat device and the head region of the aircraft seat of the at least one aircraft seat device. The at least one enclosure, preferably above the head region in the lying position, preferably has an upper end which at least in portions configures an at least substantially straight edge which is aligned so as to be perpendicular to the sitting direction of the at least one aircraft seat device, preferably when viewed perpendicularly to a plane that is aligned so as to be parallel to the aircraft cabin floor. The at least one enclosure preferably extends from the at least substantially straight edge to at least one storage surface of the at least one console of the at least one aircraft seat device, wherein the at least one storage surface is disposed between the at least substantially straight edge and the aircraft cabin floor. A length of this extent, measured parallel to the aircraft cabin floor and in the sitting direction, preferably corresponds to preferably at least 30 cm, and particularly preferably at least 40 cm, and/or preferably at most 60 cm, and particularly preferably at most 50 cm. The at least one enclosure, when viewed in the sitting direction, preferably has an incline in front of the aircraft seat. The incline is preferably configured as a flat region of the at least one enclosure. The incline preferably has an angle of preferably at least 10 degrees, preferably at least 20 degrees, and particularly preferably at least 30 degrees, in relation to an axis which is aligned so as to be perpendicular to the aircraft cabin floor. The incline is preferably inclined toward the aircraft seat of the at least one aircraft seat device. In particular in the case of a completely lowered partition unit, an advantageously simple and ergonomic line of sight between the aircraft seat of the at least one aircraft seat device and an adjacent aircraft seat of an adjacent aircraft seat device can be made possible by means of the incline. As a result, people travelling together in pairs and preferably seated opposite one another in the aircraft seat and the adjacent aircraft seat can communicate with each other in an advantageously simple and comfortable manner. Furthermore, advantageously open aircraft seat regions having the advantageous effect of a large space can be provided by means of the incline. The at least one further aircraft seat device particularly preferably has at least one further enclosure which in the lying position of the at least one further aircraft seat device at least substantially covers a further head region of the further aircraft seat of the at least one further aircraft seat device. The at least one enclosure and the at least one further enclosure are preferably configured so as to be integral to one another. "Integral" is preferably to be understood to mean at least connected in a materially integral manner, for example by a welding process, an adhesive process, a molding process and/or any other process which appears expedient to the person skilled in the art, and/or understood to mean advantageously molded in one piece, for instance as a result of a production from one casting, for example, and/or as a result of a production in a single-component or a multi-component injection molding method, and advantageously from a single blank.

It is furthermore proposed that a seat central axis of an aircraft seat of the at least one aircraft seat device, in particular when viewed perpendicularly to the aircraft cabin floor, intersects the further seat base of the further aircraft seat of the at least one further aircraft seat device. A complexity in terms of components can advantageously be reduced as a result of this design embodiment, as a result of which a cost-effective production of the at least one aircraft seat device and of the at least one further aircraft seat device is made possible. Furthermore, an advantageously compact aircraft seat assembly can be achieved as a result of this design embodiment. A "seat central axis" is preferably to be understood to mean an axis which runs parallel to the sitting direction and through a center of the aircraft seat, preferably of the seat base and/or of the backrest, wherein the center preferably has identical minimum spacings from two armrests of the aircraft seat. The seat central axis of the aircraft seat is preferably aligned so as to be parallel to a further seat central axis of the further aircraft seat. When viewed preferably perpendicularly to the aircraft cabin floor, the seat central axis and the further seat central axis are preferably mutually spaced apart. In principle, it would also be conceivable that the seat central axis of the aircraft seat of the at least one aircraft seat device and the further seat central axis of the further aircraft seat of the at least one further aircraft seat device are disposed in a plane which is aligned so as to be perpendicular to the aircraft cabin floor.

It is moreover proposed that the lying direction of the at least one aircraft seat device and the further lying direction of the at least one further aircraft seat device are directed toward one another. An advantageously compact aircraft seat assembly and at the same time an advantageously high level of comfort can be achieved as a result of this design embodiment. The lying direction of the at least one aircraft seat device is preferably directed away from an aircraft cabin aisle. The further lying direction of the at least one further aircraft seat device is preferably directed away from a further aircraft cabin aisle.

It is furthermore proposed that the at least one aircraft seat device in the lying position of the at least one aircraft seat device implements a lying plane which from the aircraft cabin floor has a spacing different from that of a further lying plane which is implemented by the at least one further aircraft seat device in the lying position of the at least one further aircraft seat device. As a result of this design embodiment, the at least one aircraft seat device and the at least one further aircraft seat device, at least in the lying position, can be disposed so as to overlap. A particularly advantageously compact aircraft seat assembly can be provided as a result. The lying plane from the aircraft cabin floor preferably has a larger or smaller minimum spacing than that of the further lying plane. A minimum spacing between the lying plane and the further lying plane, when measured perpendicularly to the aircraft cabin floor, preferably is preferably at least 20 cm, more preferably at least 25 cm, and particularly preferably at least 30 cm. A surface of the backrest of the aircraft seat of the at least one aircraft seat device, a surface of the seat base of the aircraft seat of the at least one aircraft seat device, and a surface of a footrest and/or leg rest element of the at least one aircraft seat device preferably configures the lying plane. In this context, a "surface" is preferably to be understood to mean a face of an aircraft seat that in the sitting position and/or in the lying position of the aircraft seat is provided for contacting a passenger, preferably as a result of the weight of the latter, wherein the face preferably delimits at least one comfort element of the aircraft seat on a side of the comfort element that faces the passenger. In this context, a "comfort element" is preferably to be understood to mean an element which provides cushioning such as, for example, a foam material element and/or a spring-core element. In the lying position, the surface of the backrest, the surface of the seat base, and the surface of the footrest and/or leg rest element preferably face away from the aircraft cabin floor. A surface of the further backrest of the further aircraft seat of the at least one further aircraft seat device, a surface of the further seat base of the further aircraft seat of the at least one further aircraft seat device, and a surface of a further footrest and/or leg rest element of the at least one further aircraft seat device preferably configures the further lying plane. In the lying position, the surface of the further backrest, the surface of the further seat base, and the surface of the further footrest and/or leg rest element preferably face away from the aircraft cabin floor. The seat base of the aircraft seat of the at least one aircraft seat device, when being transferred from the sitting position to the lying position, is preferably provided to be raised from the aircraft cabin floor or lowered toward the aircraft cabin floor. The further seat base of the further aircraft seat of the at least one further aircraft seat device, when being transferred from the sitting position to the lying position, is preferably provided to be lowered toward the aircraft cabin floor or raised from the aircraft cabin floor. In principle, it would also be conceivable that the seat base of the aircraft seat, or the further seat base of the further aircraft seat, in the lying position have identical spacings from the aircraft cabin floor.

It is furthermore proposed that a foot space of the at least one aircraft seat device, and a further foot space of the at least one further aircraft seat device, in particular when viewed perpendicularly to the aircraft cabin floor, are disposed so as to overlap. An available installation space can advantageously be utilized as a result of this design embodiment. An advantageously compact aircraft seat assembly can be provided as a result. A "foot space" is preferably to be understood to mean a space in which at least one foot of a passenger in a customary sleeping posture in the lying position rests. The foot space of the at least one aircraft seat device is preferably disposed in the at least one console of the at least one aircraft seat device. The footrest and/or leg rest element of the at least one aircraft seat device is preferably at least substantially disposed in the foot space of the at least one aircraft seat device. The further foot space of the at least one further aircraft seat device is preferably disposed in the at least one further console of the at least one further aircraft seat device. The further footrest and/or leg rest element of the at least one further aircraft seat device is preferably at least substantially disposed in the further foot space of the at least one further aircraft seat device.

It is moreover proposed that the at least one aircraft seat device and the at least one further aircraft seat device have at least one common console. An available installation space can advantageously be utilized as a result of this design embodiment. An advantageously compact aircraft seat assembly can be provided as a result. The at least one common console is preferably disposed between the aircraft seat of the at least one aircraft seat device and the further aircraft seat of the at least one further aircraft seat device. The at least one console of the at least one aircraft seat device and the at least one further console of the at least one further aircraft seat device are preferably integrally configured. The at least one console of the at least one aircraft seat device and the at least one further console of the at least one further aircraft seat device particularly preferably configure the at least one common console.

It is furthermore proposed that the aircraft seat assembly comprises at least one adjacent aircraft seat device which is configured so as to be at least substantially identical to the at least one aircraft seat device, wherein the at least one console is able to be at least partially utilized from the at least one adjacent aircraft seat device. An installation space can advantageously be completely utilized as a result of this design embodiment. An advantageously compact aircraft seat assembly can be provided as a result. Furthermore, a passenger of the at least one adjacent aircraft seat device can advantageously comfortably access the at least one console as a result of this design embodiment. An advantageously high level of comfort is achieved as a result. "Utilizable" is preferably to be understood to mean that at least one component and/or one space of the at least one console and/or at least one function of the at least one console is accessible, adjustable and/or operable by a passenger in the at least one adjacent aircraft seat device. The at least one common console preferably has at least one stowage space. The at least one stowage space is preferably accessible only from the at least one adjacent aircraft seat device. The at least one stowage space is particularly preferably disposed above the foot space and the further foot space. An axis which is aligned perpendicularly to the aircraft cabin floor preferably intersects the foot space of the at least one aircraft seat device, the foot space of the at least one further aircraft seat device, and the at least one stowage space of the at least one console.

It is furthermore proposed that the at least one aircraft seat device and the at least one further aircraft seat device conjointly implement an at least substantially rectangular base area. An available area of the at least one seat column can advantageously be utilized as a result of this design embodiment. Furthermore, an advantageously variable number of aircraft seat devices can be disposed along an aircraft longitudinal axis as a result of this design embodiment. As a result, the aircraft seat assembly can be implemented in an advantageously simple manner in aircraft cabins of different designs. A "base area" is preferably to be understood to mean an area which, when viewed perpendicularly to the aircraft cabin floor, is enclosed by an external contour of the at least one aircraft seat device and of the at least one further aircraft seat device. It is conceivable here that a foot space of the at least one aircraft seat device, and/or a further foot space of the at least one further aircraft seat device, protrude(s) into at least one region of at least one adjacent aircraft seat device. The at least substantially rectangular base area along an aircraft longitudinal axis is preferably delimited by a partition wall of the at least one aircraft seat device and by a further partition wall of the at least one further aircraft seat device. The partition wall is preferably configured so as to be continuous between an aircraft cabin aisle and a further aircraft cabin aisle or an aircraft cabin external wall of the aircraft cabin. A direction of main extent of the partition wall is preferably aligned so as to be orthogonal to an aircraft longitudinal axis.

It is moreover proposed that the sitting direction of the at least one aircraft seat device is aligned so as to be at least substantially parallel to an aircraft longitudinal axis. An advantageously comfortable aircraft seat assembly having an advantageously large utilizable area of the at least one aircraft seat device can be provided as a result of this design embodiment. The sitting direction of the at least one aircraft seat device preferably deviates from the lying direction of the at least one aircraft seat device by preferably at least 18 degrees, preferably at least 25 degrees, and particularly preferably at least 30 degrees. The aircraft seat, preferably the seat base, of the at least one aircraft seat device is preferably disposed in one and the same position in the sitting position and in the lying position. The seat base of the aircraft seat of the at least one aircraft seat device is preferably disposed so as to be immovable in one position and/or in one alignment. In principle however, it is conceivable that the aircraft seat of the at least one aircraft seat device has a backrest which is pivotable in relation to the seat base, and/or a seat base articulation. The further sitting direction of the at least one further aircraft seat device is particularly preferably aligned so as to be at least substantially parallel to an aircraft longitudinal axis. The further sitting direction of the at least one further aircraft seat device preferably deviates from the further lying direction of the at least one further aircraft seat device by preferably at least 18 degrees, preferably at least 25 degrees, and particularly preferably at least 30 degrees. The further aircraft seat, preferably the further seat base, of the at least one further aircraft seat device is preferably disposed in one and the same position in the sitting position and in the lying position. The further seat base of the further aircraft seat of the at least one further aircraft seat device is preferably disposed so as to be immovable in one position and/or in one alignment. In principle, the further aircraft seat of the at least one further aircraft seat device can have a further backrest which is pivotable in relation to the further seat base, and/or a seat base articulation.

It is furthermore proposed that an axis perpendicular to an aircraft longitudinal axis, in particular in the sitting position of the at least one aircraft seat device and of the at least one further aircraft seat device, intersects the seat base of the aircraft seat of the at least one aircraft seat device and the further seat base of the further aircraft seat of the at least one further aircraft seat device. An advantageously compact mutual disposal of the at least one aircraft seat assembly and of the at least one further aircraft seat assembly can be achieved as a result of this design embodiment.

Furthermore, an advantageously high level of privacy can be achieved as a result of this design embodiment, as a result of which an advantageously high level of comfort is made possible. The axis is preferably aligned so as to be parallel to the aircraft cabin floor. Exactly two seat bases are preferably disposed next to one another in the at least one common seat column, specifically the seat base of the aircraft seat of the at least one aircraft seat device, and the further seat base of the further aircraft seat of the at least one further aircraft seat device.

It is furthermore proposed that the at least one aircraft seat device in a lying position of the at least one aircraft seat device implements a lying plane which to at most 60% is implemented by the aircraft seat of the at least one aircraft seat device. As a result of this design embodiment, an advantageously comfortable aircraft seat assembly having an advantageously large utilizable area of the at least one aircraft seat device can be provided. Preferably, the lying plane is preferably configured to at most 60%, preferably at most 50%, and particularly preferably at most 40%, by the seat base of the aircraft seat of the at least one aircraft seat device. The at least one aircraft seat device preferably has at least one comfort element which preferably configures a bed surface. When viewed in the sitting direction, the at least one comfort element is preferably disposed next to the seat base of the aircraft seat. Particularly preferably, the lying plane is preferably configured to at least 30%, preferably at least 40%, and particularly preferably at least 60%, by the at least one comfort element of the at least one aircraft seat device. The at least one comfort element is preferably configured so as to be integral to the seat base of the aircraft seat of the at least one aircraft seat device. The at least one further aircraft seat device in a lying position of the at least one further aircraft seat device preferably configures a further lying plane which to at most 60% is implemented by the further aircraft seat of the at least one further aircraft seat device. Preferably, the further lying plane is preferably configured to at most 60%, preferably at most 50%, and particularly preferably at most 40%, by the further seat base of the further aircraft seat of the at least one further aircraft seat device. The at least one further aircraft seat device preferably has at least one further comfort element which preferably configures a further bed surface. When viewed in the further sitting direction, the at least one further comfort element is preferably disposed next to the further seat base of the further aircraft seat. Particularly preferably, the further lying plane is preferably configured to at least 30%, preferably at least 40%, and particularly preferably at least 60%, by the at least one further comfort element of the at least one further aircraft seat device. The at least one further comfort element is preferably configured so as to be integral to the further seat base of the further aircraft seat of the at least one further aircraft seat device.

Moreover proposed is an aircraft seat device of the aircraft seat assembly according to the invention. An advantageously compact aircraft seat assembly can be achieved as a result of this design embodiment.

The aircraft seat assembly according to the invention herein is not intended to be limited to the application and embodiment described above. In particular, the aircraft seat assembly according to the invention for fulfilling a functional mode described herein can have a number of individual elements, components and units that deviates from a number mentioned herein.

DRAWINGS

Further advantages are derived from the following description of the drawing. Four exemplary embodiments of the invention are illustrated in the drawing. The drawings, the description and the claims contain numerous features in combination. The person skilled in the art will expediently also consider the features individually and combine the latter so as to form meaningful further combinations.

DESCRIPTION OF THE EXEMPLARY EMBODIMENTS

Figure 1:
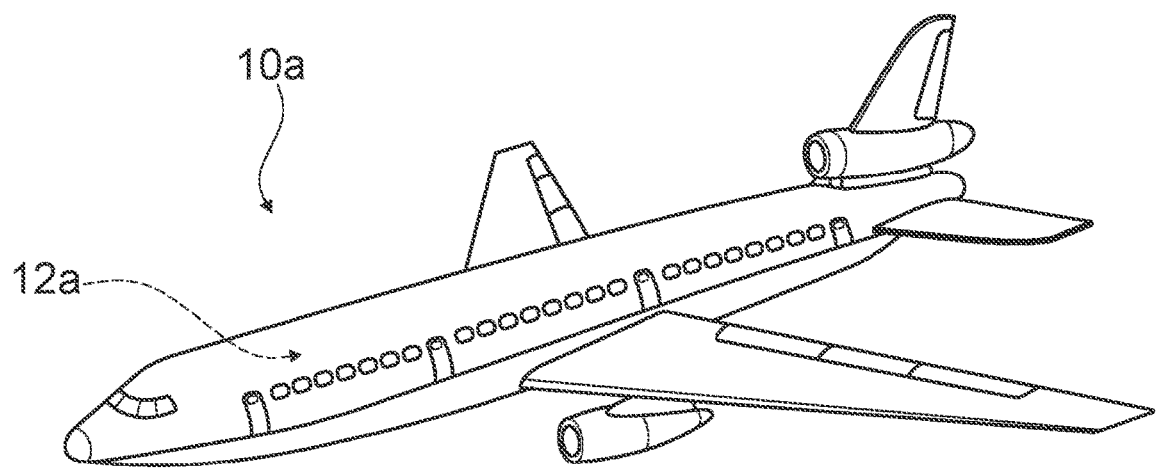
FIG. 1 shows an aircraft in a schematic illustration, in a first exemplary embodiment.

FIG. 1 shows an aircraft 10a. The aircraft 10a has an aircraft cabin 12a. The aircraft 10a has an aircraft seat assembly 14a. FIGS. 2 to 5 show the aircraft seat assembly 14a in a first exemplary embodiment. The aircraft seat assembly 14a is provided for use in the partially illustrated aircraft cabin 12a of the aircraft 10a. The aircraft cabin 12a is provided for accommodating all passengers during a flight.

The aircraft cabin 12a has an aircraft cabin central axis 16a. The aircraft cabin central axis 16a is configured as an aircraft longitudinal axis. The aircraft cabin 30 central axis 16a has identical spacings from each of the mutually opposite aircraft cabin external walls 18a, 20a of the aircraft cabin 12a. The aircraft cabin central axis 16a is aligned so as to be parallel to a rolling axis of the aircraft 10a. The aircraft cabin central axis 16a is aligned so as to be parallel to an aircraft cabin floor 22a of the aircraft cabin 12a. The aircraft cabin central axis 16a is preferably disposed on the aircraft cabin floor 22a. The aircraft cabin 12a has an aircraft cabin central plane which is not illustrated in more detail. The aircraft cabin central plane along the aircraft cabin central axis 16a is aligned perpendicularly to the aircraft cabin floor 22a. The aircraft 10a in at least one operating state has a flight direction 24a. The flight direction 24a in the present case in an idealized manner is aligned so as to be parallel to the aircraft cabin central axis 16a.

The aircraft cabin 12a along the aircraft cabin central axis 16a has an aircraft cabin portion 26a. The aircraft seat assembly 14a is disposed in the aircraft cabin portion 26a. The aircraft cabin 12a can additionally have at least one further aircraft cabin portion which, when viewed in the flight direction 24a, is preferably in front of or behind the aircraft cabin portion 26a. The aircraft cabin portion 26a in the present case is delimited by a plurality of aircraft cabin partition elements 28a and by a plurality of schematically illustrated aircraft cabin modules 30a along the aircraft cabin central axis 16a. The aircraft cabin partition elements 28a in the present case are in each case configured as an aircraft cabin partition wall. The aircraft cabin modules 30a in the present case are in each case configured as a galley module, as a washroom module, as a wardrobe, or as a front row monument.

In the present case, the aircraft cabin 12a in the aircraft cabin portion 26a has two aircraft cabin aisles 32a, 34a. Alternatively, it would also be conceivable that the aircraft cabin 12a has only a single aircraft cabin aisle. The aircraft cabin 12a has an aircraft cabin aisle 32a. The aircraft cabin 12a has a further aircraft cabin aisle 34a. The aircraft cabin aisles 32a, 34a extend in each case at least substantially along an aircraft longitudinal axis which is not illustrated in more detail.

In the present case, the aircraft seat assembly 14a comprises four seat columns 36a, 38a, 40a, 42a. Alternatively, it would also be conceivable that the aircraft seat assembly 14a comprises only two or three seat columns. The four seat columns 36a, 38a, 40a, 42a each extend in the flight direction 24a. The aircraft seat assembly 14a comprises a first seat column 36a. The first seat column 36a is configured as a first inner seat column. The aircraft seat assembly 14a comprises a second seat column 38a. The second seat column 38a is configured as a second inner seat column. The first seat column 36a and the second seat column 38a are disposed directly next to one another. The aircraft cabin 12a has a central region 44a. The central region 44a is delimited by the two aircraft cabin aisles 32a, 34a. The first seat column 36a and the second seat column 38a are disposed in the central region 44a. A maximum combined extent of the first seat column 36a and of the second seat column 38a, measured perpendicularly to the aircraft cabin central axis 16a and parallel to the aircraft cabin floor 22a, corresponds to a minimum spacing between the aircraft cabin aisle 32a and the further aircraft cabin aisle 34a. The first seat column 36a and the second seat column 38a, when viewed perpendicularly to the aircraft cabin central axis 16a and parallel to the aircraft cabin floor 22a, at least substantially completely fill the central region 44a. In principle, it would also be conceivable that only one seat column is disposed in the central region 44a of the aircraft cabin 12a. The aircraft seat assembly 14a comprises a third seat column 40a. The third seat column 40a is configured as a first outer seat column. The first seat column 36a and the third seat column 40a are mutually spaced apart by the aircraft cabin aisle 32a. The aircraft seat assembly 14a comprises a fourth seat column 42a. The fourth seat column 42a is configured as a second outer seat column. The second seat column 38a and the fourth seat column 42a are mutually spaced apart by the further aircraft cabin aisle 34a. In the present case, the fourth seat column 42a by way of the aircraft cabin central axis 16a is configured so as to be symmetrical to the third seat column 40a.

The aircraft seat assembly 14a comprises an aircraft seat device 46a. The aircraft seat device 46a is disposed in the first seat column 36a. The aircraft seat assembly 14a comprises a further aircraft seat device 48a. The further aircraft seat device 48a is disposed in the first seat column 36a. The aircraft seat device 46a and the further aircraft seat device 48a are disposed so as to be at least partially next to one another in a common seat column, specifically the first seat column 36a. Exactly two aircraft seat devices are disposed so as to be directly next to one another in the common first seat column 36a, specifically the aircraft seat device 46a and the further aircraft seat device 48a. The aircraft seat device 46a and the further aircraft seat device 48a, when viewed perpendicularly to the aircraft cabin central axis 16a, are disposed in the first seat column 36a so as to at least partially overlap one another. The aircraft seat device 46a and the further aircraft seat device 48a are disposed so as to be directly mutually adjacent in the first seat column 36a. The aircraft seat device 46a and the further aircraft seat device 48a are disposed so as to be directly behind one another and directly next to one another in the first seat column. The aircraft seat device 46a and the further aircraft seat device 48a have in each case direct access to the same aircraft cabin aisle 32a.

The aircraft seat assembly 14a comprises an adjacent aircraft seat device 46'a. The adjacent aircraft seat device 46'a is configured so as to be at least substantially identical to the aircraft seat device 46a. The adjacent aircraft seat device 46'a is disposed in the first seat column 36a. The adjacent aircraft seat device 46'a is disposed so as to be adjacent to the further aircraft seat device 48a along an aircraft longitudinal axis. The adjacent aircraft seat device 46'a, when viewed in the flight direction 24a, is disposed directly in front of the further aircraft seat device 48a. The adjacent aircraft seat device 46'a is spaced apart from the aircraft seat device 46a by the further aircraft seat device 48a. In principle, it is conceivable that an adjacent aircraft seat device 46'a which is disposed in the first seat column 36a and in a first seat row and/or in a last seat row in the aircraft cabin portion 26a is configured differently from the aircraft seat device 46a. As a result, additional space can advantageously be made available in the first seat row and/or in the last seat row.

The aircraft seat assembly 14a comprises an adjacent further aircraft seat device 48'a. The adjacent further aircraft seat device 48'a is configured so as to be at least substantially identical to the further aircraft seat device 48a. The adjacent further aircraft seat device 48'*a* is disposed in the first seat column 36*a*. The adjacent further aircraft seat device 48'*a* is disposed so as to be adjacent to the aircraft seat device 46*a* along an aircraft longitudinal axis. The adjacent further aircraft seat device 48'*a*, when viewed in the flight direction 24*a*, is disposed directly behind the further aircraft seat device 48*a*. The adjacent further aircraft seat device 48'*a* is spaced apart from the further aircraft seat device 48*a* by the aircraft seat device 46*a*.

The aircraft seat assembly 14*a* comprises another adjacent aircraft seat device 50*a*. The other adjacent aircraft seat device 50*a* is disposed in the second seat column 38*a*. The other adjacent aircraft seat device 50*a* is disposed so as to be at least partially adjacent to the further aircraft seat device 48*a* along an axis perpendicular to the aircraft cabin central axis 16*a*. The other adjacent aircraft seat device 50*a*, when viewed in the flight direction 24*a*, is disposed so as to be at least partially directly next to the aircraft seat device 46*a*. The other adjacent aircraft seat device 50*a*, when viewed in the flight direction 24*a*, is disposed so as to be at least partially directly next to the further aircraft seat device 48*a*. The other adjacent aircraft seat device 50*a* by way of the aircraft cabin central axis 16*a* is configured as a mirror image of the aircraft seat device 46*a*. The other adjacent aircraft seat device 50*a* is disposed so as to be offset along the aircraft cabin central axis 16*a* in relation to the aircraft seat device 46*a*. The other adjacent aircraft seat device 50*a* along the aircraft cabin central axis 16*a* is disposed so as to be offset in relation to the aircraft seat device 46*a* by half a maximum aircraft seat device spacing between the aircraft seat device 46*a* and the adjacent aircraft seat device 46'*a*. The aircraft seat device spacing between the aircraft seat device 46*a* and the adjacent aircraft seat device 46'*a* is measured along an aircraft longitudinal axis. The aircraft seat device spacing between the aircraft seat device 46*a* and the adjacent aircraft seat device 46'*a* is measured between two measuring points that are identically disposed in the aircraft seat device 46*a* and the adjacent aircraft seat device 46'*a*.

The aircraft seat assembly 14*a* comprises another adjacent further aircraft seat device 52*a*. The other adjacent further aircraft seat device 52*a* is disposed in the second seat column 38*a*. The other adjacent further aircraft seat device 52*a* is disposed so as to be adjacent to the other adjacent aircraft seat device 50*a* along an aircraft longitudinal axis. The other adjacent further aircraft seat device 52*a*, when viewed in the flight direction 24*a*, is disposed directly behind the other adjacent aircraft seat device 50*a*. The other adjacent further aircraft seat device 52*a* is disposed so as to be at least partially adjacent to the aircraft seat device 46*a* along an axis perpendicular to the aircraft cabin central axis 16*a*. The other adjacent further aircraft seat device 52*a*, when viewed in the flight direction 24*a*, is disposed so as to be at least partially directly next to the aircraft seat device 46*a*. The other adjacent further aircraft seat device 52*a* by way of the aircraft cabin central axis 16*a* is configured as a mirror image of the further aircraft seat device 48*a*. The other adjacent further aircraft seat device 52*a* is disposed so as to be offset along the aircraft cabin central axis 16*a* in relation to the further aircraft seat device 48*a*. The other adjacent further aircraft seat device 52*a* along the aircraft cabin central axis 16*a* is disposed so as to be offset in relation to the further aircraft seat device 48*a* by half a maximum further aircraft seat device spacing between the further aircraft seat device 48*a* and the adjacent further aircraft seat device 48'*a*. The further aircraft seat device spacing between the further aircraft seat device 48*a* and the adjacent further aircraft seat device 48'*a* is measured along an aircraft longitudinal axis. The further aircraft seat device spacing between the further aircraft seat device 48*a* and the adjacent further aircraft seat device 48'*a* is measured between two measuring points that are identically disposed in the further aircraft seat device 48*a* and the adjacent further aircraft seat device 48'*a*. The further aircraft seat device spacing is configured so as to be identical to the aircraft seat device spacing.

The aircraft seat device 46*a* and the further aircraft seat device 48*a* configure a seat group 54*a* of the aircraft seat assembly 14*a*. The seat group 54*a* configures a, preferably periodically, repeatable sequence. In the present case, the aircraft seat assembly 14*a* comprises four seat groups 54*a*, 54'*a*, 54"*a*, 54'"*a*, which are disposed so as to be directly behind one another in the first seat column 36*a* and which are in each case formed from the aircraft seat device 46*a* and the further aircraft seat device 48*a*. The four seat groups 54*a*, 54'*a*, 54"*a*, 54'"*a* which are disposed directly behind one another in the first seat column 36*a* are of an identical configuration.

Figure 2:
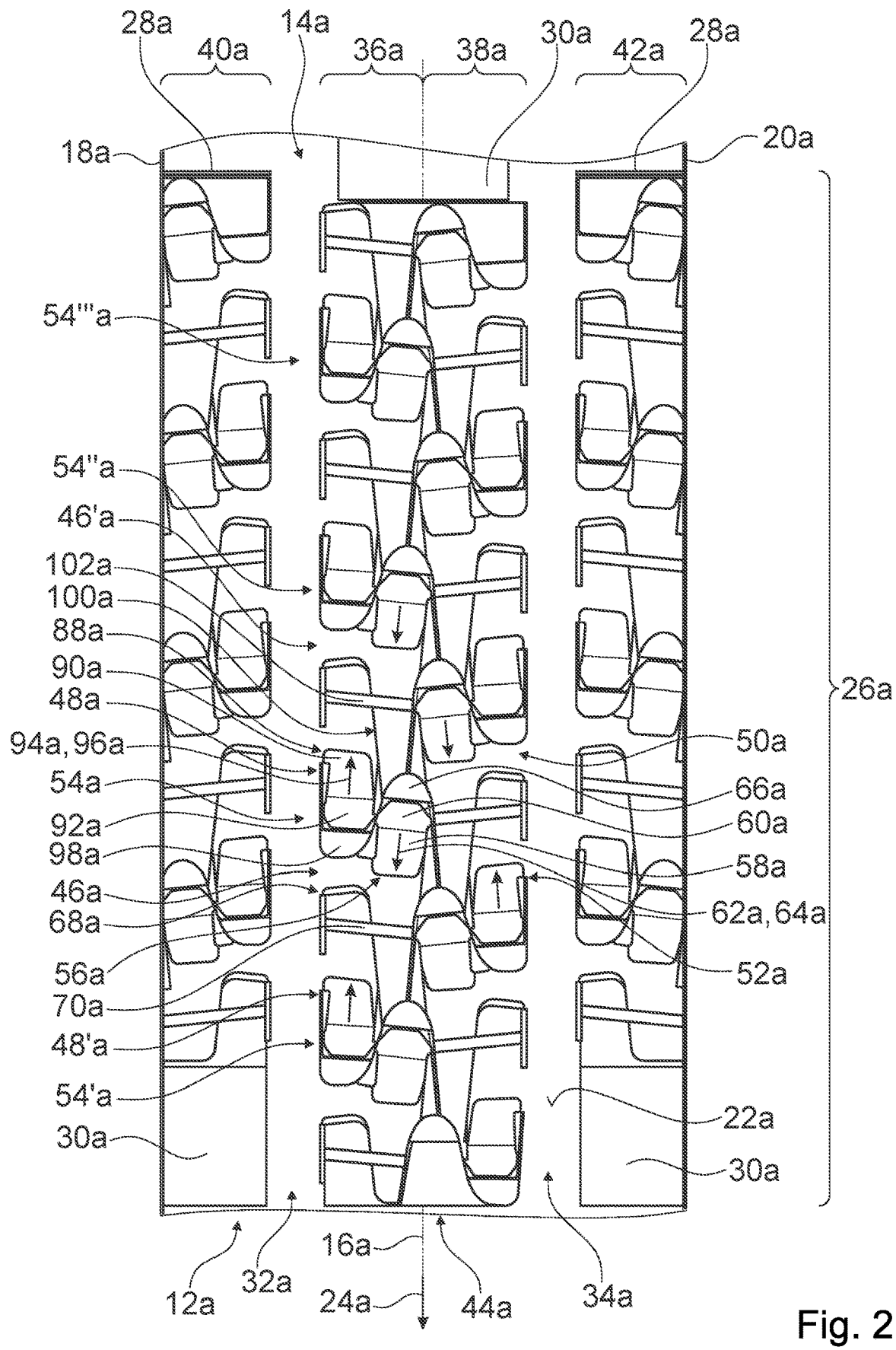
FIG. 2 shows an aircraft seat assembly according to the invention in a schematic illustration, in the first exemplary embodiment.
Figure 3:
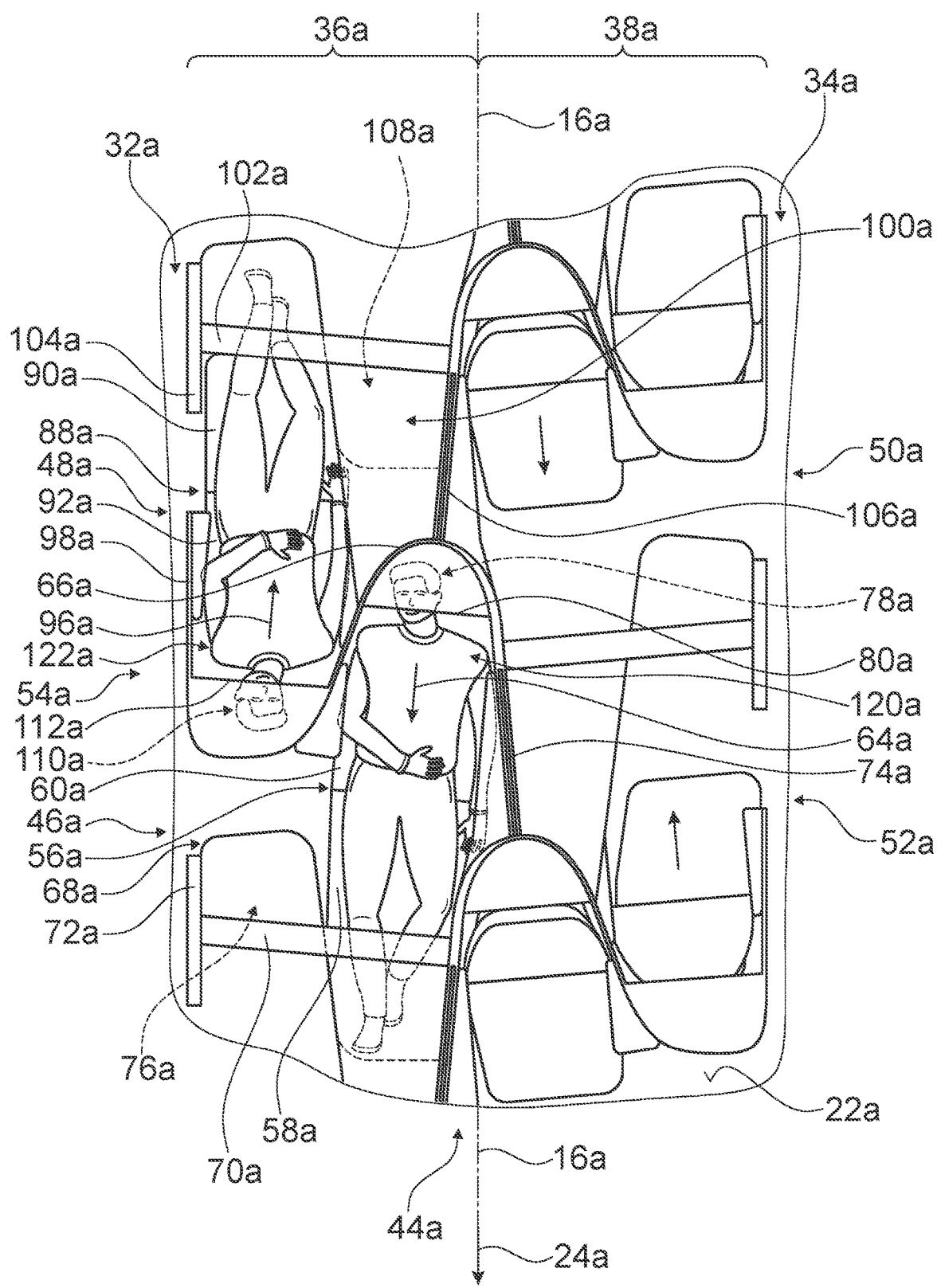
FIG. 3 shows a fragment of the aircraft seat assembly according to the invention from FIG. 2, in a schematic illustration in the first exemplary embodiment.
Figure 4:
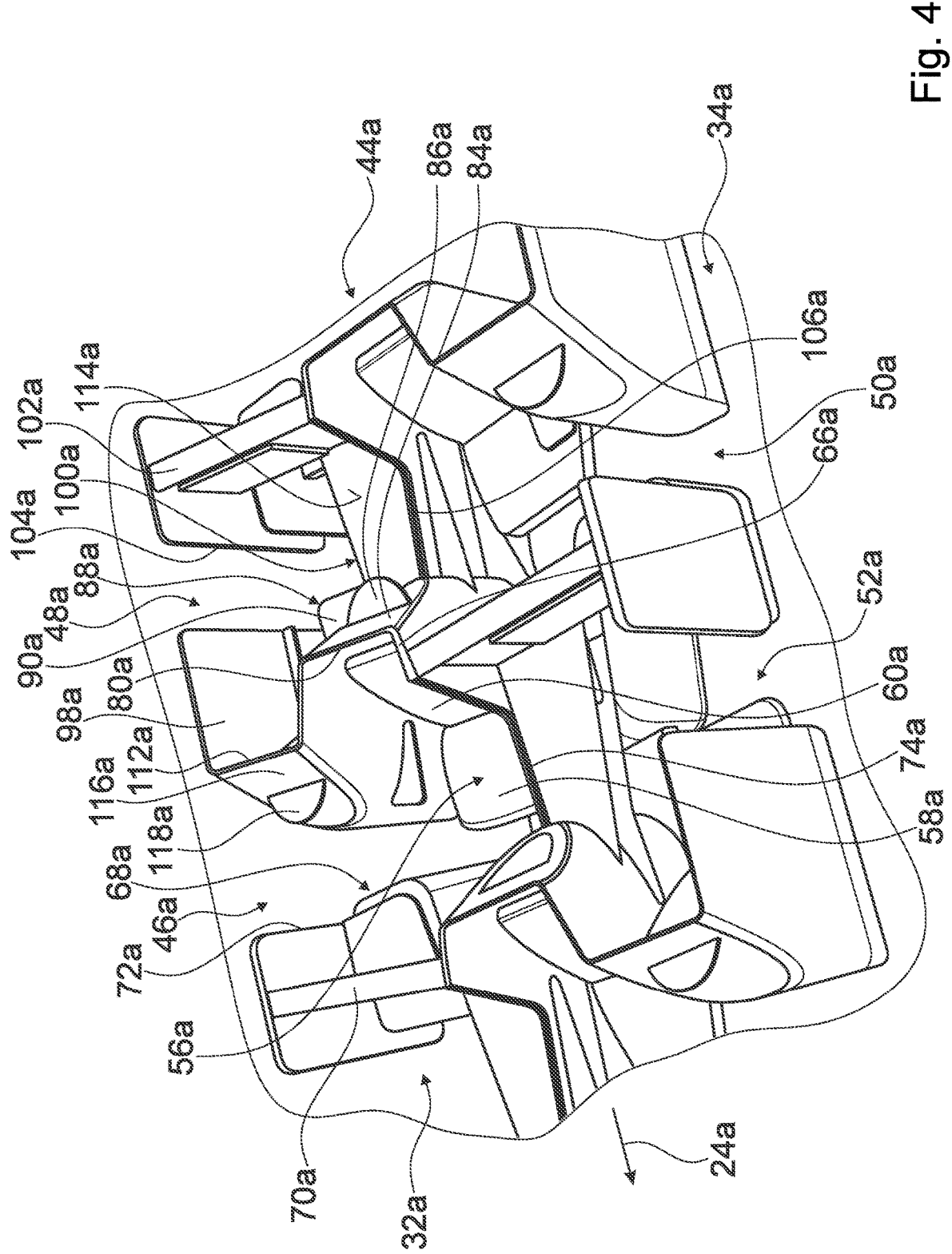
FIG. 4 shows a perspective view of the aircraft seat assembly according to the invention in a schematic illustration, in the first exemplary embodiment.
Figure 5:
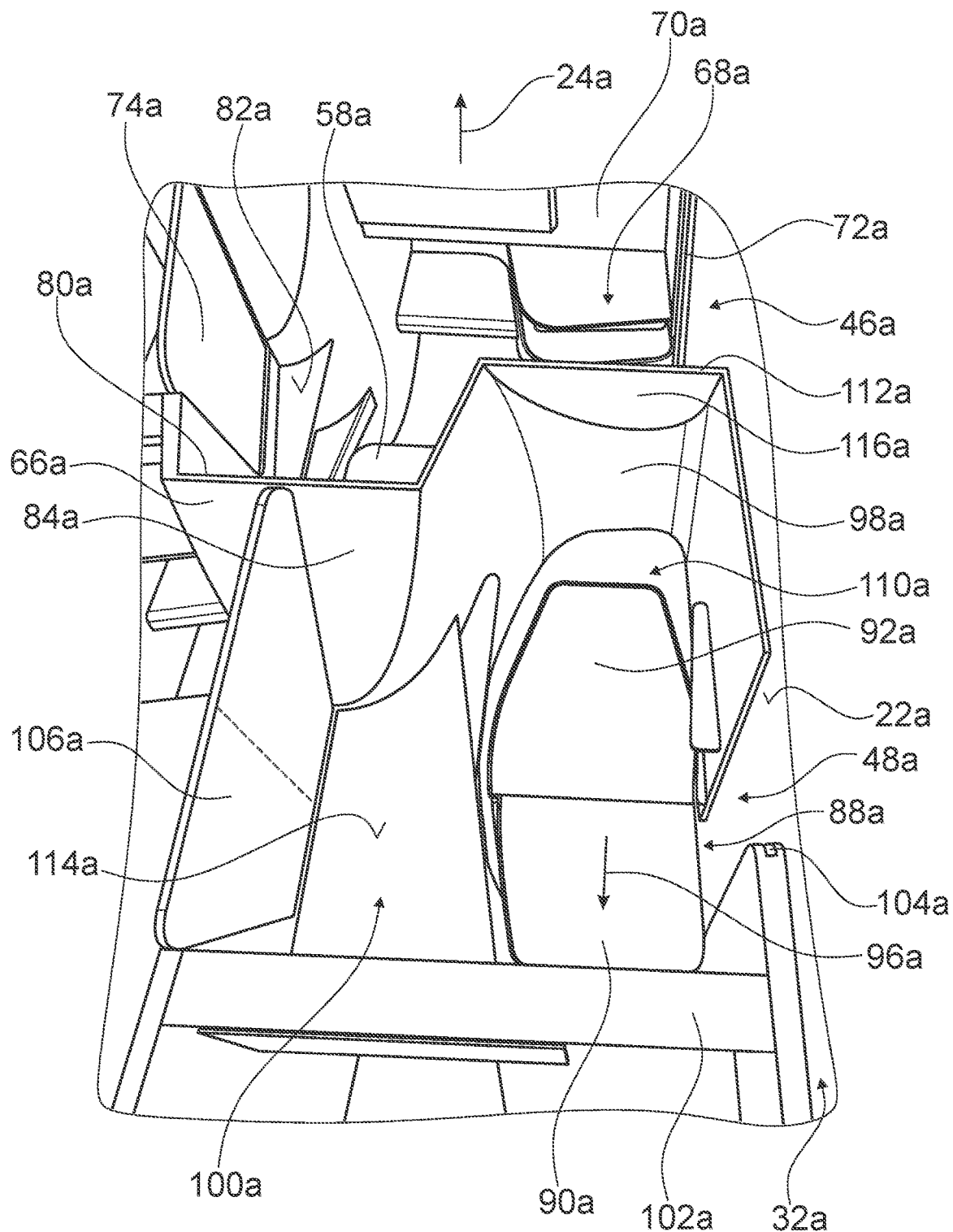
FIG. 5 shows a perspective view of the aircraft seat assembly according to the invention in a schematic illustration, in the first exemplary embodiment.

The aircraft seat device 46*a* is provided for mounting on the aircraft cabin floor 22*a* of the aircraft cabin 12*a*. The aircraft seat device 46*a* configures an aircraft seat region. The aircraft seat device 46*a* has an aircraft seat 56*a*. The aircraft seat 56*a* is disposed in the aircraft seat region of the aircraft seat device 46*a*. The aircraft seat 56*a* is envisaged for providing a seat for a passenger in the aircraft 10*a*. The aircraft seat 56*a* is configured as a fully-flat seat. The aircraft seat 56*a* comprises a seat base 58*a*. The aircraft seat 56*a* comprises a backrest 60*a*. The aircraft seat 56*a* comprises two armrests. Additionally, it would be conceivable for the aircraft seat 56*a* to comprise a leg rest. In principle, the aircraft seat 56*a* can comprise additional add-on parts such as preferably a headrest. The aircraft seat device 46*a* is adjustable between a sitting position and a lying position. The aircraft seat 56*a* is electromechanically adjustable between the sitting position and the lying position. The aircraft seat device 46*a* comprises at least one adjustment unit which is not illustrated in more detail and is provided for adjusting the aircraft seat 56*a* between the sitting position and the lying position. The aircraft seat 56*a* of the aircraft seat device 46*a* is configured so as to be rotationally fixed in terms of a movement about an axis perpendicular to the aircraft cabin floor 22*a*. The aircraft seat device 46*a* in FIGS. 2, 4 and 5 is shown in the sitting position. The aircraft seat device 46*a* in FIG. 3 is shown in the lying position. The aircraft seat device 46*a* has a sitting direction 62*a*. The sitting direction 62*a* of the aircraft seat device 46*a* has a directional component in the flight direction 24*a*. The sitting direction 62*a* of the aircraft seat device 46*a* is aligned so as to be angled in relation to the aircraft cabin central axis 16*a* by at least 5 degrees. Alternatively, it would also be conceivable that the sitting direction 62*a* of the aircraft seat device 46*a* is aligned so as to be parallel to the aircraft cabin central axis 16*a* or at an angle of less than 5 degrees in relation to the aircraft cabin central axis 16*a*. The sitting direction 62*a* of the aircraft seat device 46*a* is directed toward the aircraft cabin aisle 32*a*. The aircraft seat device 46*a* has a lying direction 64*a*. The sitting direction 62*a* corresponds to the lying direction 64*a*. The lying direction 64*a* of the aircraft seat device 46*a* has a directional component in the flight direction 24*a*. The lying direction 64*a* of the aircraft seat device 46*a* is aligned so as to be angled in relation to the aircraft cabin central axis 16*a* by at least 5 degrees. Alternatively, it would also be conceivable that the lying direction 64*a* of the aircraft seat device 46*a* is aligned so as to be parallel to the aircraft cabin central axis 16a or at an angle of less than 5 degrees in relation to the aircraft cabin central axis 16a. The lying direction 64a of the aircraft seat device 46a is directed toward the aircraft cabin aisle 32a. The aircraft seat device 46a has an enclosure 66a. The enclosure 66a is configured as a shell element. The aircraft seat device 46a has a console 68a. The console 68a is utilizable by two aircraft seat devices which are disposed so as to be directly mutually adjacent, specifically by the aircraft seat device 46a and the adjacent further aircraft seat device 48'a. The console 68a configures a foot space 76a. The foot space 76a of the console 68a of the aircraft seat device 46a is utilizable exclusively by a passenger that is accommodated in an adjacent further aircraft seat region of the adjacent further aircraft seat device 48'a. Additionally, the aircraft seat device 46a can also have at least one ottoman. The aircraft seat device 46a has at least one table unit which is not illustrated in more detail. The table unit is disposed on the console 68a of the aircraft seat device 46a. The aircraft seat device 46a has a partition wall 70a. The partition wall 70a of the aircraft seat device 46a, when viewed in the sitting direction 62a, is disposed behind the aircraft seat 56a. A direction of main extent of the partition wall 70a of the aircraft seat device 46a runs perpendicularly to the sitting direction 62a. The partition wall 70a of the aircraft seat device 46a from the aircraft cabin floor 22a has a maximum spacing which is at least 80% of a maximum spacing of the enclosure 66a from the aircraft cabin floor 22a. The partition wall 70a of the aircraft seat device 46a is provided for permanently visually separating the aircraft seat region of the aircraft seat device 46a from the adjacent further aircraft seat region of the adjacent further aircraft seat device 48'a. The partition wall 70a of the aircraft seat device 46a is configured so as to be integral to a partition wall of the adjacent further aircraft seat device 48'a. The aircraft seat device 46a has a display screen. The display screen is disposed on the partition wall 70a. The aircraft seat device 46a in the present case has two partition units 72a, 74a. A first partition unit 72a of the aircraft seat device 46a in at least one operating state is provided for visually separating the aircraft seat region from the aircraft cabin aisle 32a. The first partition unit 72a of the aircraft seat device 46a is configured so as to be adjustable. The first partition unit 72a of the aircraft seat device 46a is coupled to the console 68a. When viewed perpendicularly to the aircraft cabin central axis 16a, a second partition unit 74a of the aircraft seat device 46a, in at least one operating state, is provided for visually separating the aircraft seat region from another adjacent further aircraft seat region of the other adjacent further aircraft seat device 52a. The second partition unit 74a of the aircraft seat device 46a is configured so as to be adjustable. The second partition unit 74a of the aircraft seat device 46a is coupled to the enclosure 66a. The second partition unit 74a of the aircraft seat device 46a is at least partially configured so as to be integral to a second further partition unit of the other adjacent further aircraft seat device 52a. The second partition unit 74a of the aircraft seat device 46a in FIG. 5 is shown to be completely deployed. The aircraft seat device 46a has direct access to the aircraft cabin aisle 32a. A passenger can directly enter the aircraft seat region of the aircraft seat device 46a from the aircraft cabin aisle 32a without traversing any other aircraft seat region. The direct access of the aircraft seat device 46a is assigned only to the aircraft seat device 46a. The direct access of the aircraft seat device 46a is utilizable only by the aircraft seat device 46a.

The enclosure 66a of the aircraft seat device 46a in the lying position of the aircraft seat device 46a at least substantially covers a head region 78a of the aircraft seat 56a of the aircraft seat device 46a. An axis, which is not illustrated in more detail and is aligned so as to be perpendicular to the aircraft cabin floor 22a, intersects the enclosure 66a of the aircraft seat device 46a and the head region 78a of the aircraft seat 56a of the aircraft seat device 46a in the lying position. The enclosure 66a in the lying position above the head region 78a has an upper end which at least in portions configures an at least substantially straight edge 80a which, preferably when viewed perpendicularly to a plane which is aligned so as to be parallel to the aircraft cabin floor 22a, is aligned so as to be at least substantially perpendicular to the sitting direction 62a of the aircraft seat device 46a. The enclosure 66a extends from the at least substantially straight edge 80a to a storage surface 82a of the aircraft seat device 46a, wherein the storage surface 82a is disposed between the at least substantially straight edge 80a and the aircraft cabin floor 22a. A length of this extent, when measured parallel to the aircraft cabin floor 22a and in the sitting direction 62a, corresponds to at least 30 cm and at most 50 cm. The enclosure 66a, when viewed in the sitting direction 62a, in front of the aircraft seat 56a has an incline 84a. The incline 84a is configured as a flat region of the enclosure 66a. The incline 84a has an angle of at least 10 degrees in relation to an axis which is aligned so as to be perpendicular to the aircraft cabin floor 22a. The incline 84a is inclined toward the aircraft seat 56a of the aircraft seat device 46a. A space behind the backrest 60a can advantageously be optimized for a passenger as a result of the incline 84a. A level of privacy and comfort can advantageously be enhanced as a result of the incline 84a. Furthermore, an improved line of sight between the further aircraft seat 88a of the further aircraft seat device 48a and another adjacent aircraft seat of the other adjacent aircraft seat device 50a can be made possible by means of the incline 84a (see FIGS. 3 to 5). As a result, people travelling together in pairs can communicate with each other in an advantageously simple and comfortable manner. Advantageously open aircraft seat regions with the effect of an advantageously large space can be provided by means of the incline 84a. The enclosure 66a on a side that faces the aircraft seat 56a has a noise-reducing material. The enclosure 66a on the side that faces the aircraft seat 56a has an illumination unit which is not shown in more detail and is provided for illuminating the aircraft seat 56a, preferably in a selective manner. In the present case, the aircraft seat device 46a can have a storage element 86a which is disposed on the enclosure 66a (FIG. 4). The storage element 86a is disposed on the incline 84a of the enclosure 66a. The storage element 86a is configured so as to be able to be folded away. The storage element 86a has an additional storage surface which is configured in a semi-circular shape. In a position of the storage element 86a in which the latter is folded out, the additional storage surface is aligned so as to be at least substantially parallel to the aircraft cabin floor 22a. In a position of the storage element 86a in which the latter is folded away, the additional storage surface is aligned so as to be at least substantially parallel to the incline 84a. Additionally or alternatively, it would also be conceivable for the storage element 86a to have a display element which is preferably able to be seen at least in the lying position. Additionally or alternatively, it would also be conceivable for the storage element 86a to have a flap and/or a mounting, for example for a tablet PC.

The further aircraft seat device 48a is provided for mounting on the aircraft cabin floor 22a of the aircraft cabin 12a.

The further aircraft seat device 48a configures a further aircraft seat region. The further aircraft seat device 48a has a further aircraft seat 88a. The further aircraft seat 88a is disposed in the further aircraft seat region. The further aircraft seat 88a is envisaged for providing a seat for a passenger in the aircraft 10a. A maximum spacing of the aircraft seat 56a of the aircraft seat device 46a from the aircraft cabin aisle 32a has a larger spacing than a maximum further spacing of the further aircraft seat 88a of the further aircraft seat device 48a from the aircraft cabin aisle 32a. The further aircraft seat 88a is configured as a fully-flat seat. The further aircraft seat 88a comprises a further seat base 90a. The further aircraft seat 88a comprises a further backrest 92a. The further aircraft seat 88a comprises two further armrests. Additionally, it would be conceivable for the further aircraft seat 88a to comprise a further leg rest. In principle, the further aircraft seat 88a can comprise further add-on parts such as preferably a further headrest. The further aircraft seat device 48a is adjustable between a sitting position and a lying position. The further aircraft seat 88a is electromechanically adjustable between the sitting position and the lying position. The further aircraft seat device 48a comprises at least one further adjustment unit which is not illustrated in more detail and is provided for adjusting the further aircraft seat 88a between the sitting position and the lying position. The further aircraft seat 88a of the further aircraft seat device 48a is configured so as to be rotationally fixed in terms of a movement about an axis perpendicular to the aircraft cabin floor 22a. The further aircraft seat device 48a in FIGS. 2 and 4 is shown in the sitting position. The further aircraft seat device 48a in FIGS. 3 and 5 is shown in the lying position. The further aircraft seat device 48a has a further sitting direction 94a. The sitting direction 62a of the aircraft seat device 46a is aligned so as to be counter to the further sitting direction 94a of the further aircraft seat device 48a. The further sitting direction 94a of the further aircraft seat device 48a has a directional component counter to the flight direction 24a. The further sitting direction 94a of the further aircraft seat device 48a is aligned so as to be angled in relation to the aircraft cabin central axis 16a by at least 5 degrees. The further sitting direction 94a of the further aircraft seat device 48a is directed away from the aircraft cabin aisle 32a. Alternatively, it would also be conceivable that the further sitting direction 94a of the further aircraft seat device 48a is aligned so as to be parallel to the aircraft cabin central axis 16a or at an angle of less than 5 degrees in relation to the aircraft cabin central axis 16a. The further aircraft seat device 48a has a further lying direction 96a. The lying direction 64a of the aircraft seat device 46a is aligned so as to be counter to the further lying direction 96a of the further aircraft seat device 48a. The further sitting direction 94a corresponds to the further lying direction 96a. The further lying direction 96a of the further aircraft seat device 48a has a directional component counter to the flight direction 24a. The further lying direction 96a of the further aircraft seat device 48a is aligned so as to be angled in relation to the aircraft cabin central axis 16a by at least 5 degrees. The further lying direction 96a of the further aircraft seat device 48a is directed away from the aircraft cabin aisle 32a. Alternatively, it would also be conceivable that the further lying direction 96a of the further aircraft seat device 48a is aligned so as to be parallel to the aircraft cabin central axis 16a or at an angle of less than 5 degrees in relation to the aircraft cabin central axis 16a. The further aircraft seat device 48a has a further enclosure 98a. The further enclosure 98a is configured as a shell element. The further enclosure 98a of the further aircraft seat device 48a is configured so as to be integral to the enclosure 66a of the aircraft seat device 46a. The further aircraft seat device 48a has a further console 100a. A maximum spacing of the console 68a of the aircraft seat device 46a from the aircraft cabin aisle 32a has a smaller spacing than a maximum further spacing of the further console 100a of the further aircraft seat device 48a from the aircraft cabin aisle 32a. The further console 100a is utilizable by two aircraft seat devices which are disposed so as to be directly mutually adjacent, specifically the adjacent aircraft seat device 46'a and the further aircraft seat device 48a. The further console 100a configures a further foot space 108a. The further foot space 108a of the further console 100a of the further aircraft seat device 48a is utilizable exclusively by a passenger that is accommodated in an adjacent aircraft seat region of the adjacent aircraft seat device 46'a. Additionally, the further aircraft seat device 48a can also have at least one further ottoman. The further aircraft seat device 48a has at least one further table unit which is not illustrated in more detail. The further table unit is disposed on the further console 100a of the further aircraft seat device 48a. The further aircraft seat device 48a has a further partition wall 102a. The further partition wall 102a of the further aircraft seat device 48a, when viewed in the further sitting direction 94a, is disposed behind the further aircraft seat 88a. A direction of main extent of the further partition wall 102a of the further aircraft seat device 48a runs perpendicularly to the further sitting direction 94a. The further partition wall 102a of the further aircraft seat device 48a from the aircraft cabin floor 22a has a maximum spacing which is at least 80% of a maximum spacing of the further enclosure 98a from the aircraft cabin floor 22a. The further partition wall 102a of the further aircraft seat device 48a is provided for permanently visually separating the further aircraft seat region of the further aircraft seat device 48a from the adjacent aircraft seat region of the adjacent aircraft seat device 46'a. The further partition wall 102a of the further aircraft seat device 48a is configured so as to be integral to a partition wall of the adjacent aircraft seat device 46'a. The further aircraft seat device 48a has a further display screen. The further display screen is disposed on the further partition wall 102a. The further aircraft seat device 48a in the present case has two further partition units 104a, 106a. A first further partition unit 104a of the further aircraft seat device 48a in at least one operating state is provided for visually separating the further aircraft seat region from the aircraft cabin aisle 32a. The first further partition unit 104a of the further aircraft seat device 48a is configured so as to be adjustable. The first further partition unit 104a of the further aircraft seat device 48a is coupled to the further partition wall 102a. When viewed perpendicularly to the aircraft cabin central axis 16a, a second further partition unit 106a of the further aircraft seat device 48a in at least one operating state is provided for visually separating the further aircraft seat region from another adjacent aircraft seat region of the other adjacent aircraft seat device 50a. The second further partition unit 106a of the further aircraft seat device 48a is configured so as to be adjustable. The second further partition unit 106a of the further aircraft seat device 48a is coupled to the further enclosure 98a. The second further partition unit 106a of the further aircraft seat device 48a is at least partially configured so as to be integral to a second partition unit of the other adjacent aircraft seat device 50a. The second further partition unit 106a of the further aircraft seat device 48a in FIG. 5 is shown to be completely deployed. The further aircraft seat device 48a has direct access to the aircraft cabin aisle 32a. A passenger can directly enter the further aircraft seat region of the further aircraft seat device 48a from the aircraft cabin aisle 32a without traversing another aircraft seat region. The direct access of the further aircraft seat device 48a is assigned only to the further aircraft seat device 48a. The direct access of the further aircraft seat device 48a is utilizable only by the further aircraft seat device 48a.

The further enclosure 98a of the further aircraft seat device 48a in the lying position of the further aircraft seat device 48a at least substantially covers a further head region 110a of the further aircraft seat 88a of the further aircraft seat device 48a. An axis, which is not illustrated in more detail and is aligned so as to be perpendicular to the aircraft cabin floor 22a, in the lying position intersects the further enclosure 98a of the further aircraft seat device 48a and the further head region 110a of the further aircraft seat 88a of the further aircraft seat device 48a. The further enclosure 98a in the lying position above the further head region 110a has a further upper end which at least in portions configures a further at least substantially straight edge 112a which is aligned so as to be perpendicular to the sitting direction 94a of the further aircraft seat device 48a, preferably when viewed perpendicularly to a plane which is aligned so as to be parallel to the aircraft cabin floor 22a. The further enclosure 98a extends from the further at least substantially straight edge 112a to a further storage surface 114a of the further aircraft seat device 48a, wherein the further storage surface 114a is disposed between the at least substantially straight edge 112a and the aircraft cabin floor 22a. A length of this extent, when measured parallel to the aircraft cabin floor 22a and in the sitting direction 94a, corresponds to at least 30 cm and at most 50 cm. The further storage surface 114a is part of the further console 100a. The further enclosure 98a, when viewed in the further sitting direction 94a, in front of the further aircraft seat 88a has a further incline 116a. The further incline 116a is configured as a flat region of the further enclosure 98a. The further incline 116a has an angle of at least 10 degrees in relation to an axis which is aligned so as to be perpendicular to the aircraft cabin floor 22a. The further incline 116a is inclined toward the further aircraft seat 88a of the further aircraft seat device 48a. A space behind the further backrest 92a can advantageously be optimized for a passenger as a result of the further incline 116a. A level of privacy and comfort can advantageously be increased as a result of the further incline 116a. Furthermore, an advantageously comfortable passage between the aircraft seat 56a of the aircraft seat device 46a and the aircraft cabin aisle 32a can be provided by means of the further incline 118a. Furthermore, by means of the further incline 118a, service in the aircraft seat region of the aircraft seat device 46a can be performed in an advantageously simple and safe manner by a crew. An advantageously open aircraft seat region having the advantageous effect of a large space can be provided by means of the further incline 118a. Furthermore, a passage from the aircraft cabin aisle 32a to the aircraft seat 56a of the aircraft seat device 46a can be advantageously widened as a result of the further incline 116a of the further enclosure 98a of the further aircraft seat device 48a. The further enclosure 98a on a side that faces the further aircraft seat 88a has a noise-reducing material. The further enclosure 98a on the side that faces the further aircraft seat 88a has a further illumination unit which is not illustrated in more detail and is provided for illuminating the further aircraft seat 88a, preferably in a selective manner. In the present case, the further aircraft seat device 48a can have a further storage element 118a which is disposed on the further enclosure 98a (FIG. 4). The further storage element 118a is disposed on the further incline 116a of the further enclosure 98a. The further storage element 118a is configured so as to be able to be folded away. The further storage element 118a has an additional further storage surface which is configured in a semi-circular shape. In a position of the further storage element 118a in which the latter is folded out, the additional further storage surface is aligned so as to be at least substantially parallel to the aircraft cabin floor 22a. In a position of the further storage element 118a in which the latter is folded away, the additional further storage surface is aligned so as to be at least substantially parallel to the further incline 116a. Additionally or alternatively, it would also be conceivable for the further storage element 118a to have a further display element which is preferably able to be seen at least in the lying position. Additionally or alternatively, it would also be conceivable for the further storage element 118a to have a further flap and/or a further mounting, for example for a tablet PC.

The sitting direction 62a of the aircraft seat device 46a is configured so as to be at least substantially parallel to the further sitting direction 94a of the further aircraft seat device 48a. The lying direction 64a of the aircraft seat device 46a is configured so as to be at least substantially parallel to the further lying direction 96a of the further aircraft seat device 48a. The lying direction 64a of the aircraft seat device 46a and the further lying direction 96a of the further aircraft seat device 48a are angled in relation to the aircraft cabin central axis 16a by angles of identical values. The lying direction 64a of the aircraft seat device 46a and the further lying direction 96a of the further aircraft seat device 48a are aligned so as to be at least substantially parallel. The lying direction 64a and the further lying direction 96a are aligned in an idealized manner to the aircraft seat device 46a and the further aircraft seat device 48a, wherein an actual lying direction defined by a passenger, preferably by virtue of an asymmetrical posture of the passenger, may deviate from the lying direction 64a and/or from the further lying direction 96a.

The aircraft seat device 46a at least partially intersects the aircraft cabin central plane. An external contour of the aircraft seat device 46a that is projected onto the aircraft cabin floor 22a at least partially intersects the aircraft cabin central plane. The projected external contour of the aircraft seat device 46a has a shape which is configured so as to correspond to an external contour of the other adjacent aircraft seat device 50a and of the other adjacent further aircraft seat device 52a, said external contour by way of the aircraft cabin central axis 16a being configured as a mirror image. The further aircraft seat device 48a is spaced apart from the aircraft cabin central plane. The further aircraft seat device 48a does not intersect the aircraft cabin central plane.

An axis which is not illustrated in more detail and is perpendicular to the aircraft cabin central axis 16a, in the sitting position of the aircraft seat device 46a and of the further aircraft seat device 48a, in the first seat column 36a intersects the aircraft seat 56a of the aircraft seat device 46a and the further aircraft seat 88a of the further aircraft seat device 48a. The axis which is perpendicular to the aircraft cabin central axis 16a, in the sitting position of the aircraft seat device 46a and of the further aircraft seat device 48a, in the first seat column 36a and the second seat column 38a intersects the aircraft seat 56a of the aircraft seat device 46a and the further aircraft seat 88a of the further aircraft seat device 48a. The axis which is perpendicular to the aircraft cabin central axis 16a, in the sitting position of the aircraft seat device 46a and of the further aircraft seat device 48a, intersects the backrest 60a of the aircraft seat 56a of the aircraft seat device 46a and the further backrest 92a of the further aircraft seat 88a of the further aircraft seat device 48a. The axis is aligned so as to be parallel to the aircraft cabin floor 22a. Exactly two backrests are disposed next to one another in the common first seat column 36a, specifically the backrest 60a of the aircraft seat 56a of the aircraft seat device 46a and the further backrest 92a of the further aircraft seat 88a of the further aircraft seat device 48a. The axis in the first seat column 36a and the second seat column 38a intersects exactly two backrests, specifically the backrest 60a of the aircraft seat 56a of the aircraft seat device 46a and the further backrest 92a of the further aircraft seat 88a of the further aircraft seat device 48a.

An axis which is not illustrated in more detail and is perpendicular to the aircraft cabin central axis 16a, in the lying position of the aircraft seat device 46a and of the further aircraft seat device 48a, intersects a shoulder region 120a of the aircraft seat device 46a and a further shoulder region 122a of the further aircraft seat device 48a. The axis is aligned so as to be parallel to the aircraft cabin floor 22a. The axis in the first seat column 36a intersects exactly two shoulder regions 120a, 122a. The axis in the first seat column 36a and in the second seat column 38a intersects exactly two shoulder regions 120a, 122a.

An axis which is not illustrated in more detail and is perpendicular to the aircraft cabin central axis 16a and parallel to the aircraft cabin floor 22a in the sitting position intersects the console 68a of the aircraft seat device 46a and another adjacent further aircraft seat of the other adjacent further aircraft seat device 52a.

An axis which is not illustrated in more detail and is perpendicular to the aircraft cabin central axis 16a and parallel to the aircraft cabin floor 22a in the sitting position intersects the further aircraft seat 88a of the further aircraft seat device 48a and another adjacent console of the other adjacent aircraft seat device 50a.

An axis which is not illustrated in more detail and is perpendicular to the aircraft cabin central axis 16a, in the sitting position of the aircraft seat device 46a and of the other adjacent further aircraft seat device 52a, intersects the seat base 58a of the aircraft seat 56a of the aircraft seat device 46a and another adjacent further seat base of the other adjacent further aircraft seat of the other adjacent further aircraft seat device 52a.

An axis which is not illustrated in more detail and is perpendicular to the aircraft cabin central axis 16a, in the sitting position of the further aircraft seat device 48a and of the other adjacent aircraft seat device 50a, intersects the further seat base 90a of the further aircraft seat 88a of the further aircraft seat device 48a and another adjacent seat base of another adjacent aircraft seat of the other adjacent aircraft seat device 50a.

The above-described features for the aircraft seat device 46a and the further aircraft seat device 48a in the first seat column 36a fundamentally apply also to the second seat column 38a, wherein all elements of the second seat column 38a by way of the aircraft cabin central axis 16a are configured as a mirror image but so as to be offset from the first seat column 36a along an aircraft longitudinal axis. The description of the aircraft seat device 46a and of the further aircraft seat device 48a from the first seat column 36a can fundamentally be used for the third seat column 40a. The description of the second seat column 38a can fundamentally be used for the fourth seat column 42a.

In principle, the aircraft seat assembly 14a illustrated in FIG. 2 is not limited to the number of aircraft seat devices shown. The aircraft seat assembly 14a here may have fewer or more than the aircraft seat devices illustrated. In principle, it would also be conceivable that the aircraft seat assembly 14a shown in FIG. 2 entirely or partially, preferably at least one of the seat columns 36a, 38a, 40a, 42a, is disposed so as to be mirror-imaged about an axis in the aircraft cabin 12a, wherein the axis is aligned so as to be perpendicular to the aircraft cabin central axis 16a and parallel to the aircraft cabin floor 22a.

Three further exemplary embodiments of the invention are shown in FIGS. 6 to 13. The descriptions and the drawings hereunder are substantially limited to the points of differentiation between the exemplary embodiments, wherein reference in terms of identically designated components, in particular in terms of components having the same reference signs, can be made in principle also to the drawings and/or the description of the other exemplary embodiments, in particular those of FIGS. 1 to 5. For the purpose of differentiating the exemplary embodiments, the suffix a has been used in the reference signs of the exemplary embodiment in FIGS. 1 to 5. The suffix a is replaced by the suffixes b to d in the exemplary embodiments of FIGS. 6 to 13.

FIGS. 6 to 9 show an aircraft seat assembly 14b in a second exemplary embodiment. The aircraft seat assembly 14b is provided for use in a partially illustrated aircraft cabin 12b of an aircraft. The aircraft cabin 12b has an aircraft cabin central axis 16b. The aircraft cabin central axis 16b is configured as an aircraft longitudinal axis. The aircraft cabin central axis 16b is identically spaced apart from each of the mutually opposite aircraft cabin external walls 18b, 20b of the aircraft cabin 12b. The aircraft cabin central axis 16b is aligned so as to be parallel to an aircraft cabin floor 22b of the aircraft cabin 12b. The aircraft cabin 12b has an aircraft cabin central plane which is not illustrated in more detail. The aircraft in at least one operating state has a flight direction 24b. The flight direction 24b in the present case in an idealized manner is aligned so as to be parallel to the aircraft cabin central axis 16b. The aircraft cabin 12b along the aircraft cabin central axis 16b has an aircraft cabin portion 26b. The aircraft cabin portion 26b in the present case is delimited by a plurality of aircraft cabin partition elements 28b and by a plurality of schematically illustrated aircraft cabin modules 30b along the aircraft cabin central axis 16b. The aircraft cabin 12b in the aircraft cabin portion 26b has two aircraft cabin aisles 32b, 34b. The aircraft cabin 12b has an aircraft cabin aisle 32b. The aircraft cabin 12b has a further aircraft cabin aisle 34b.

In the present case, the aircraft seat assembly 14b comprises three seat columns 36b, 40b, 42b. The three seat columns 36b, 40b, 42b each extend in the flight direction 24b. The aircraft seat assembly 14b comprises a first seat column 36b. The first seat column 36b is configured as an inner seat column. The aircraft cabin 12b has a central region 44b. The central region 44b is delimited by the two aircraft cabin aisles 32b, 34b. The first seat column 36b is disposed in the central region 44b. A maximum extent of the first seat column 36b, measured perpendicularly to the aircraft cabin central axis 16b and parallel to the aircraft cabin floor 22b, corresponds to a minimum spacing between the aircraft cabin aisle 32b and the further aircraft cabin aisle 34b. The first seat column 36b, when viewed perpendicularly to the aircraft cabin central axis 16b and parallel to the aircraft cabin floor 22b, at least substantially completely fills the central region 44b. The aircraft seat assembly 14b comprises a second seat column 40b. The second seat column 40b is configured as a first outer seat column. The first seat column 36b and the second seat column 40b are mutually spaced apart by the aircraft cabin aisle 32b. The aircraft seat assembly 14b comprises a third seat column 42b. The third seat column 42b is configured as a second outer seat column. The first seat column 36b and the third seat column 42b are mutually spaced apart by the further aircraft cabin aisle 34b. In the present case, the third seat column 42b by way of the aircraft cabin central axis 16b is configured so as to be symmetrical to the second seat column 40b.

The aircraft seat assembly 14b comprises an aircraft seat device 46b. The aircraft seat device 46b is disposed in the first seat column 36b. The aircraft seat device 46b intersects the aircraft cabin central plane. The aircraft seat assembly 14b comprises a further aircraft seat device 48b. The further aircraft seat device 48b is disposed in the first seat column 36b. The further aircraft seat device 48b intersects the aircraft cabin central plane. The aircraft seat device 46b and the further aircraft seat device 48b are disposed so as to be at least partially next to one another in a common seat column, specifically the first seat column 36b. The aircraft seat device 46b and the further aircraft seat device 48b, when viewed perpendicularly to the aircraft cabin central axis 16b, are disposed so as to at least partially overlap in the first seat column 36b. The aircraft seat device 46b and the further aircraft seat device 48b are disposed so as to be directly mutually adjacent in the first seat column 36b. The aircraft seat device 46b and the further aircraft seat device 48b are disposed so as to be directly behind one another and directly next to one another in the first seat column. The aircraft seat device 46b and the further aircraft seat device 48b have in each case direct access to different aircraft cabin aisles 32b, 34b.

The aircraft seat assembly 14b comprises an adjacent aircraft seat device 46'b. The adjacent aircraft seat device 46'b is configured so as to be at least substantially identical to the aircraft seat device 46b. The adjacent aircraft seat device 46'b is disposed in the first seat column 36b. The adjacent aircraft seat device 46'b is disposed so as to be adjacent to the aircraft seat device 46b along an aircraft longitudinal axis. The adjacent aircraft seat device 46'b, when viewed in the flight direction 24b, is disposed so as to be directly behind the aircraft seat device 46b.

The aircraft seat assembly 14b comprises an adjacent further aircraft seat device 48'b. The adjacent further aircraft seat device 48'b is configured so as to be at least substantially identical to the further aircraft seat device 48b. The adjacent further aircraft seat device 48'b is disposed in the first seat column 36b. The adjacent further aircraft seat device 48'b is disposed so as to be adjacent to the further aircraft seat device 48b along an aircraft longitudinal axis. The adjacent further aircraft seat device 48'b, when viewed in the flight direction 24b, is disposed directly in front of the further aircraft seat device 48b.

The aircraft seat device 46b and the further aircraft seat device 48b configure a seat group 54b of the aircraft seat assembly 14b. The seat group 54b configures a, preferably periodically, repeatable sequence. In the present case, the aircraft seat assembly 14b comprises six seat groups 54b, 54'b, 54"b, 54'"b, 54""b, 54'""b which are disposed directly behind one another in the first seat column 36b and are in each case formed from the aircraft seat device 46b and the further aircraft seat device 48b. The six seat groups 54b, 54'b, 54"b, 54'"b, 54""b, 54'""b which are disposed directly behind one another in the first seat column 36b are of identical configuration.

Figure 6:
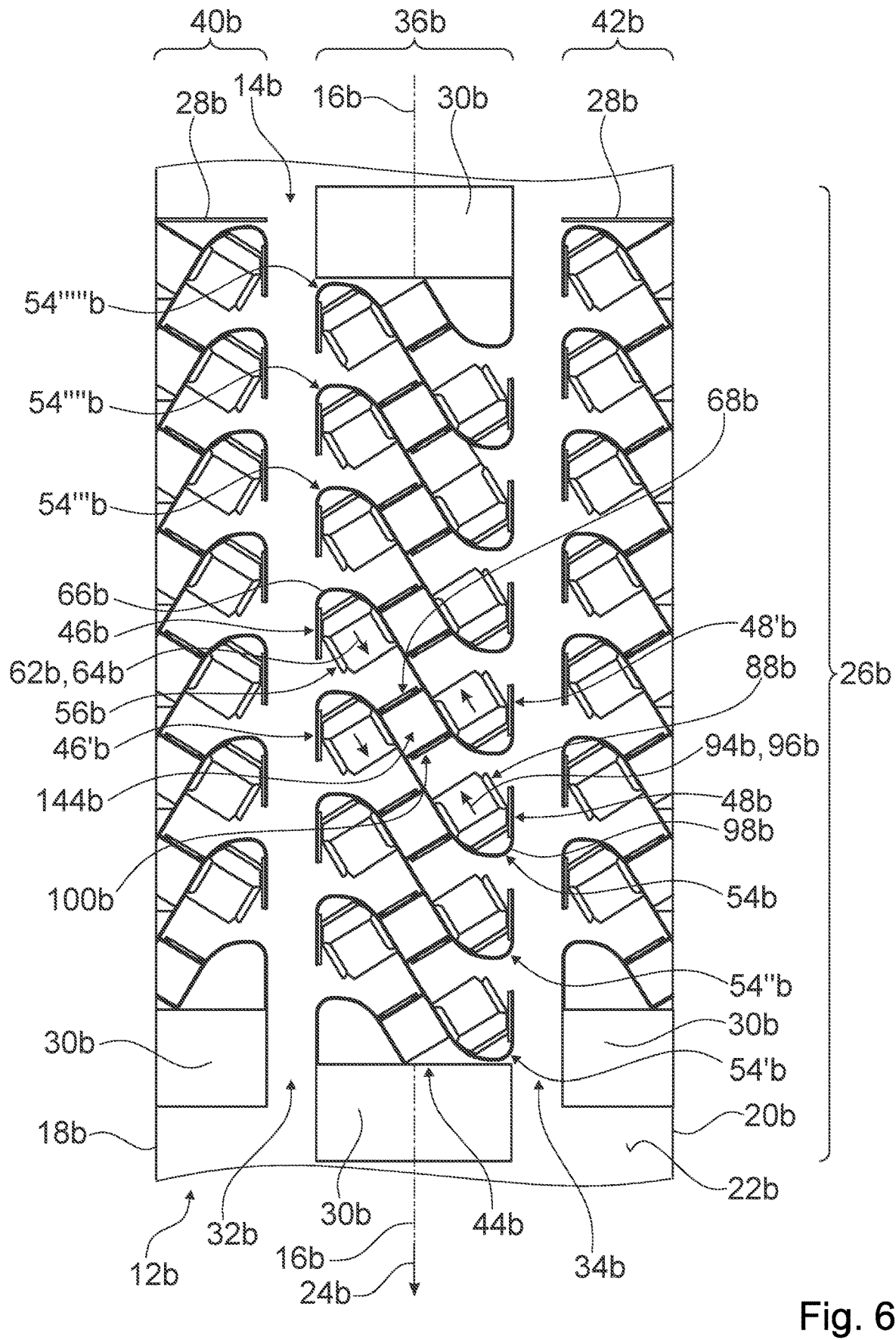
FIG. 6 shows an aircraft seat assembly according to the invention in a schematic illustration, in a second exemplary embodiment.
Figure 7:
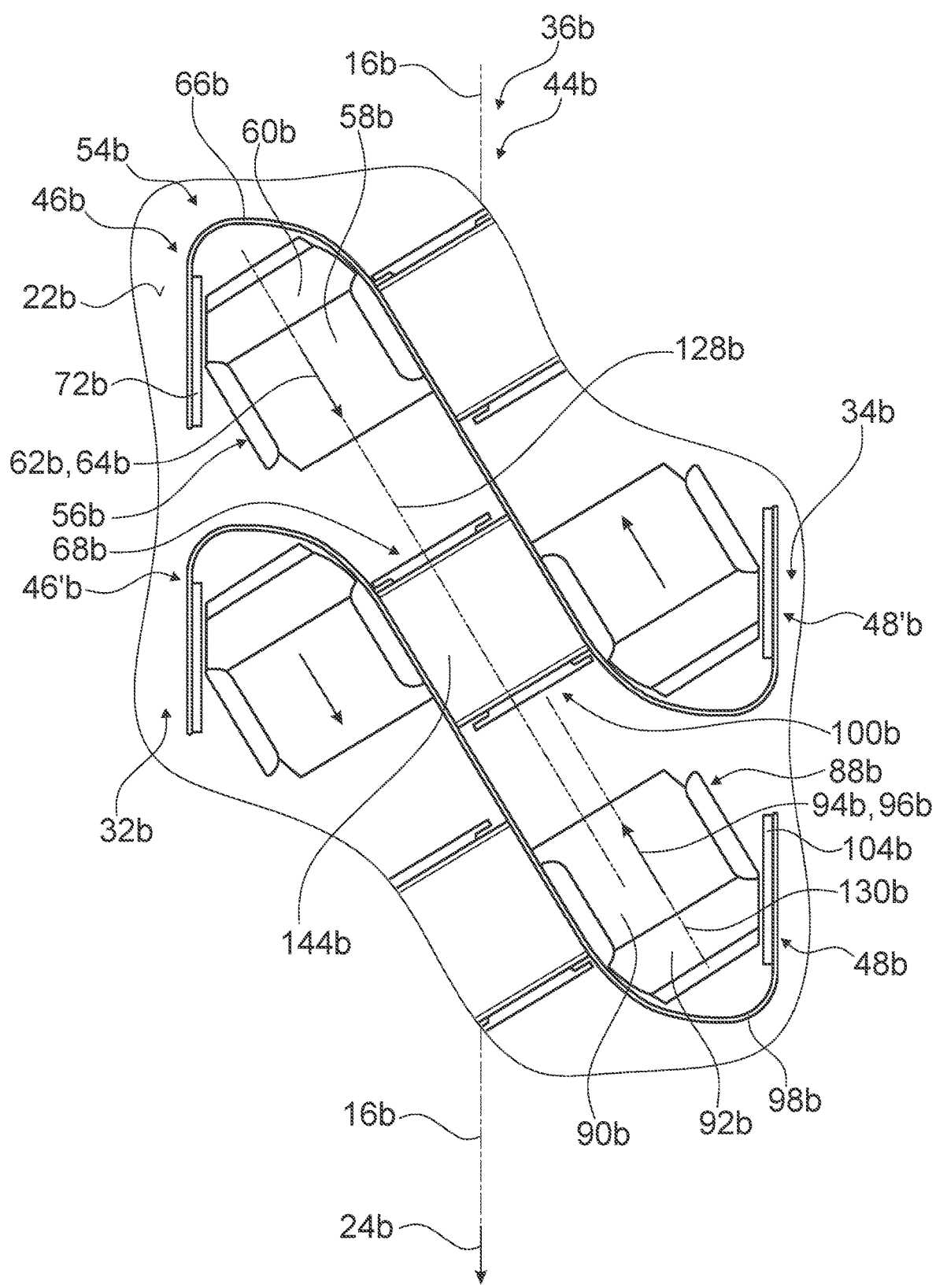
FIG. 7 shows a fragment of the aircraft seat assembly according to the invention from FIG. 6, in a schematic illustration in the second exemplary embodiment.
Figure 8:
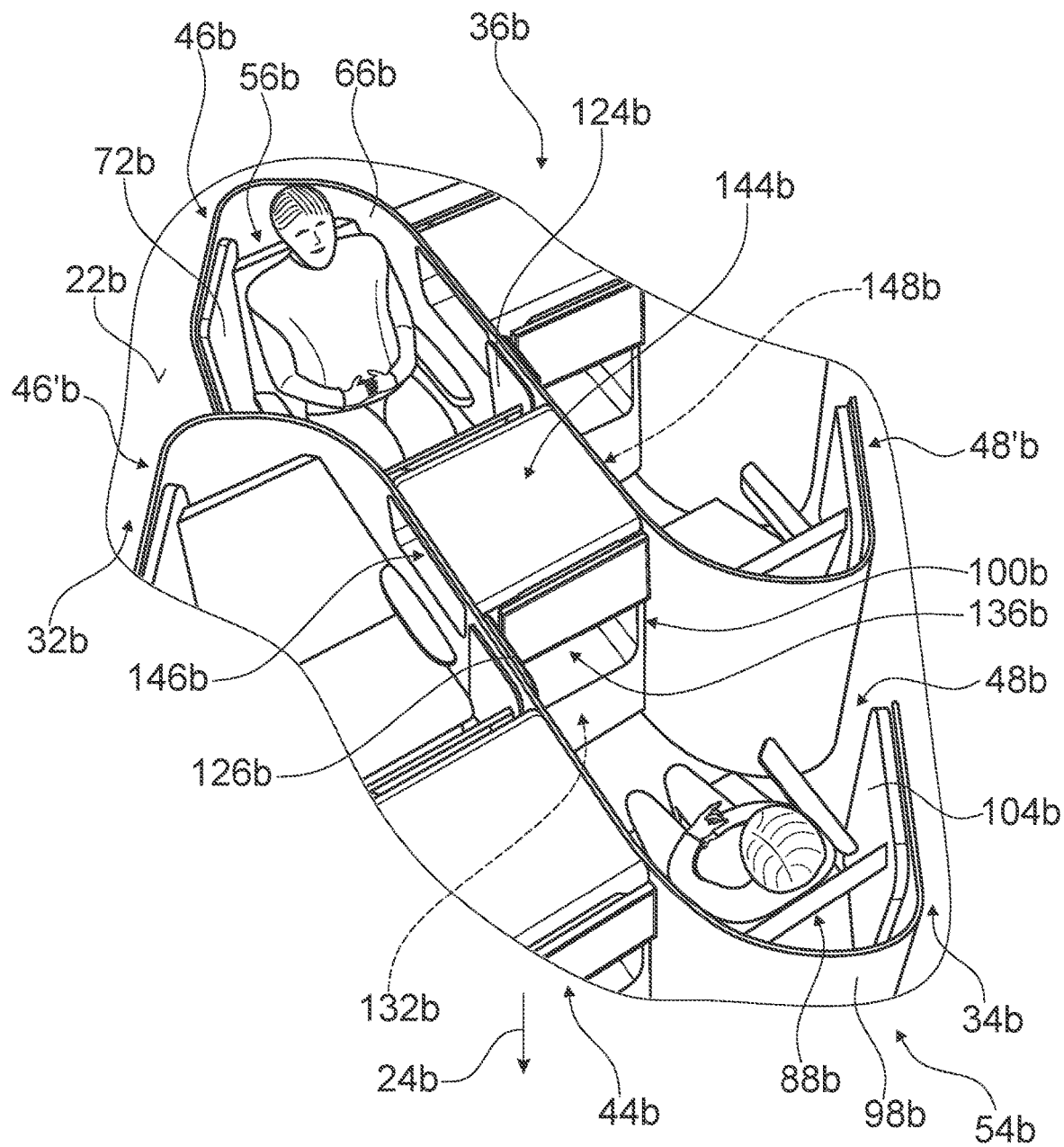
FIG. 8 shows a perspective view of the aircraft seat assembly according to the invention in a schematic illustration, in the second exemplary embodiment.
Figure 9:
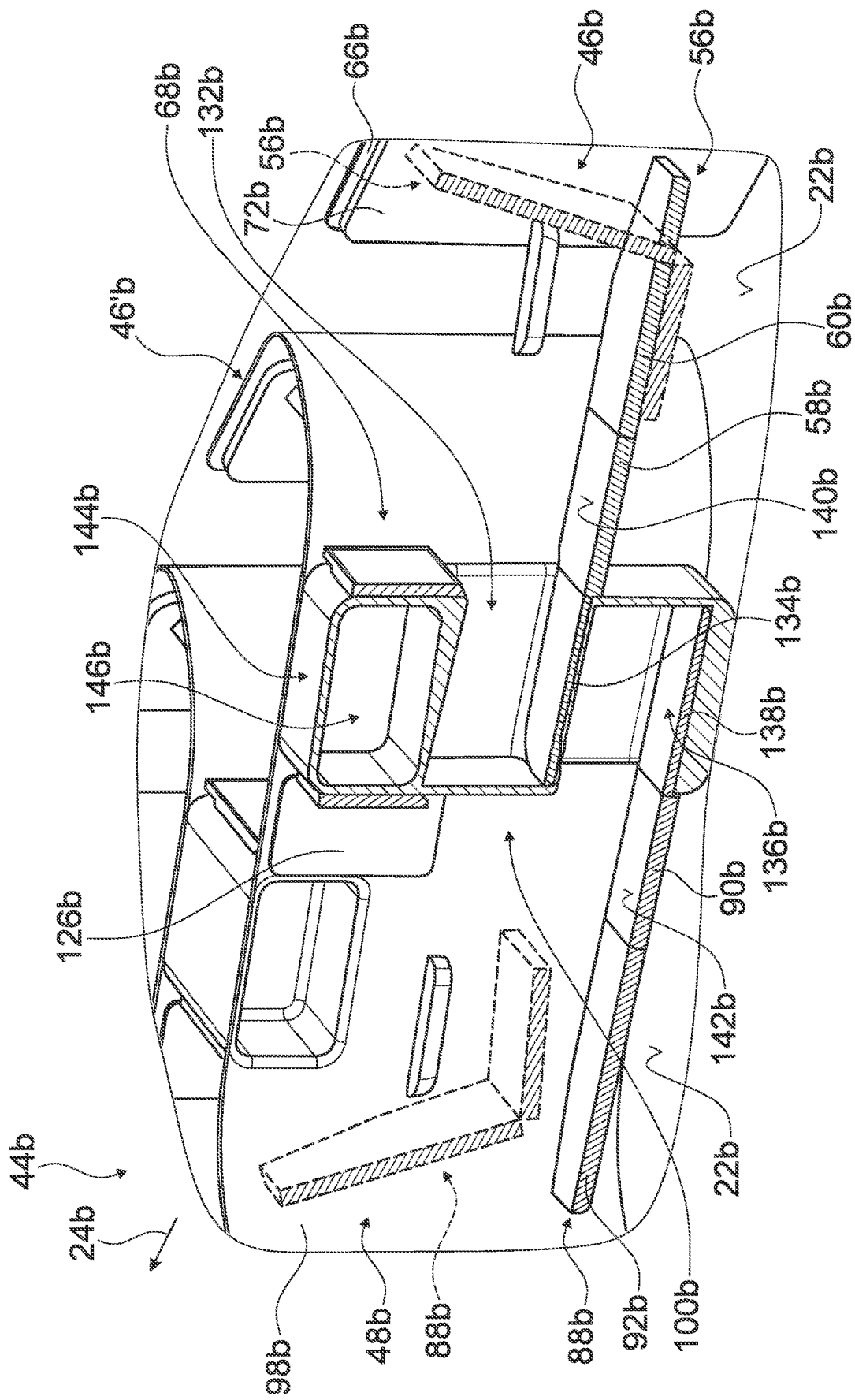
FIG. 9 shows a perspective sectional view of the aircraft seat assembly according to the invention in a schematic illustration, in the second exemplary embodiment.

The aircraft seat device 46b configures an aircraft seat region. The aircraft seat device 46b has an aircraft seat 56b. The aircraft seat 56b is configured as a fully-flat seat. The aircraft seat 56b comprises a seat base 58b. The aircraft seat 56b comprises a backrest 60b. The aircraft seat 56b comprises two armrests. The aircraft seat device 46b is adjustable between a sitting position and a lying position. The aircraft seat 56b is electromechanically adjustable between the sitting position and the lying position. The aircraft seat device 46b in FIGS. 6 to 8 is shown in the sitting position. The aircraft seat device 46b in FIG. 9 is shown in the lying position. The aircraft seat device 46b has a sitting direction 62b. The aircraft seat device 46b has a lying direction 64b. The sitting direction 62b corresponds to the lying direction 64b. The lying direction 64b of the aircraft seat device 46b has a directional component in the flight direction 24b. The lying direction 64b of the aircraft seat device 46b is aligned so as to be angled in relation to the aircraft cabin central axis 16b by at least 30 degrees. The lying direction 64b of the aircraft seat device 46b is directed away from the aircraft cabin aisle 32b. The aircraft seat device 46b has an enclosure 66b. The enclosure 66b is configured as a shell element. The enclosure 66b of the aircraft seat device 46b is preferably configured so as to be integral to an adjacent further enclosure of the adjacent further aircraft seat device 48'b. The aircraft seat device 46b has a console 68b. The console 68b is utilizable by at least two aircraft seat devices which are disposed so as to be directly mutually adjacent, specifically the aircraft seat device 46b and the further aircraft seat device 48b. The console 68b intersects the aircraft cabin central plane. The aircraft seat device 46b has a display screen. The display screen is disposed on the console 68b. The aircraft seat device 46b has a table unit 124b. The table unit 124b is disposed on the enclosure 66b of the aircraft seat device 46b. The aircraft seat device 46b in the present case has a partition unit 72b. The partition unit 72b of the aircraft seat device 46b in at least one operating state is provided for visually separating the aircraft seat region from the aircraft cabin aisle 32b. The partition unit 72b of the aircraft seat device 46b is configured so as to be adjustable. The partition unit 72b of the aircraft seat device 46b is coupled to the enclosure 66b. The aircraft seat device 46b has direct access to the aircraft cabin aisle 32b. A passenger can enter the aircraft seat region of the aircraft seat device 46b from the aircraft cabin aisle 32b without traversing another aircraft seat region. The direct access of the aircraft seat device 46b is assigned only to the aircraft seat device 46b. The direct access of the aircraft seat device 46b is utilizable only by the aircraft seat device 46b. The further aircraft seat device 48b configures a further aircraft seat region. The further aircraft seat device 48b has a further aircraft seat 88b. The further aircraft seat 88b is configured as a fully-flat seat. A maximum further spacing of the further aircraft seat 88b of the further aircraft seat device 48b from the aircraft cabin aisle 32b has a larger spacing than a maximum spacing of the aircraft seat 56b of the aircraft seat device 46b from the aircraft cabin aisle 32b. The further aircraft seat 88b comprises a further seat base 90b. The further aircraft seat 88b comprises a further backrest 92b. The further aircraft seat 88b comprises two further armrests. The further aircraft seat device 48b is adjustable between a sitting position and a lying position. The further aircraft seat 88b is electromechanically adjustable between the sitting position and the lying position. The further aircraft seat device 48b in FIGS. 6 to 8 is shown in the sitting position. The further aircraft seat device 48b in FIG. 9 is shown in the lying position. The further aircraft seat device 48b has a further sitting direction 94b. The sitting direction 62b of the aircraft seat device 46b is aligned so as to be counter to the further sitting direction 94b of the further aircraft seat device 48b. The further aircraft seat device 48b has a further lying direction 96b. The lying direction 64*b* of the aircraft seat device 46*b* is aligned so as to be counter to the further lying direction 96*b* of the further aircraft seat device 48*b*. The further sitting direction 94*b* corresponds to the further lying direction 96*b*. The further lying direction 96*b* of the further aircraft seat device 48*b* has a directional component counter to the flight direction 24*b*. The further lying direction 96*b* of the further aircraft seat device 48*b* is aligned so as to be angled in relation to the aircraft cabin central axis 16*b* by at least 30 degrees. The further lying direction 96*b* of the further aircraft seat device 48*b* is directed away from the further aircraft cabin aisle 34*b*. The further aircraft seat device 48*b* has a further enclosure 98*b*. The further enclosure 98*b* is configured as a shell element. The further enclosure 98*b* of the further aircraft seat device 48*b* is preferably configured so as to be integral to an adjacent enclosure of the adjacent aircraft seat device 46'*b*. The further aircraft seat device 48*b* has a further console 100*b*. The further console 100*b* intersects the aircraft cabin central plane. A minimum spacing of the console 68*b* of the aircraft seat device 46*b* from the aircraft cabin aisle 32*b* has an identical spacing to a minimum further spacing of the further console 100*b* of the further aircraft seat device 48*b* from the further aircraft cabin aisle 34*b*. The further console 100*b* is utilizable by at least two aircraft seat devices which are disposed so as to be directly mutually adjacent, specifically the aircraft seat device 46*b* and the further aircraft seat device 48*b*. The further aircraft seat device 48*b* has a further display screen. The further display screen is disposed on the further console 100*b*. The further display screen is preferably configured so as to be displaceable toward the aircraft cabin floor 22*b*. The further display screen can in principle also be configured so as to be pivotable parallel to the aircraft cabin floor 22*b* by way of an axis. As a result, an advantageously optimum visibility of the further display screen can be provided in the lying position of the further aircraft seat device 48*b*. The further aircraft seat device 48*b* has a further table unit 126*b*. The further table unit 126*b* is disposed on the further console 100*b* of the further aircraft seat device 48*b*. The further aircraft seat device 48*b* in the present case has a further partition unit 104*b*. The further partition unit 104*b* of the further aircraft seat device 48*b* in at least one operating state is provided for visually separating the further aircraft seat region from the further aircraft cabin aisle 34*b*. The further partition unit 104*b* of the further aircraft seat device 48*b* is configured so as to be adjustable. The further partition unit 104*b* of the further aircraft seat device 48*b* is coupled to the further enclosure 98*b*. The further aircraft seat device 48*b* has direct access to the further aircraft cabin aisle 34*b*. A passenger can directly enter the further aircraft seat region of the further aircraft seat device 48*b* from the further aircraft cabin aisle 34*b* without traversing another aircraft seat region. The direct access of the further aircraft seat device 48*b* is assigned only to the further aircraft seat device 48*b*. The direct access of the further aircraft seat device 48*b* is utilizable only by the further aircraft seat device 48*b*.

The sitting direction 62*b* of the aircraft seat device 46*b* is configured so as to be at least substantially parallel to the further sitting direction 94*b* of the further aircraft seat device 48*b*. The sitting direction 62*b* of the aircraft seat device 46*b* and the further sitting direction 94*b* of the further aircraft seat device 48*b* are directed toward one another. The lying direction 64*b* of the aircraft seat device 46*b* is configured so as to be at least substantially parallel to the further lying direction 96*b* of the further aircraft seat device 48*b*. The lying direction 64*b* of the aircraft seat device 46*b* and the further lying direction 96*b* of the further aircraft seat device 48*b* are directed toward one another. The lying direction 64*b* of the aircraft seat device 46*b* and the further lying direction 96*b* of the further aircraft seat device 48*b* are angled in relation to the aircraft cabin central axis 16*b* by angles of identical value. The lying direction 64*b* of the aircraft seat device 46*b* and the further lying direction 96*b* of the further aircraft seat device 48*b* are aligned so as to be at least substantially parallel. The lying direction 64*b* and the further lying direction 96*b* are aligned in an idealized manner to the aircraft seat device 46*b* and to the further aircraft seat device 48*b*, wherein an actual lying direction defined by a passenger, preferably by virtue of an asymmetrical posture of the passenger, may deviate from the lying direction 64*b* and/or from the further lying direction 96*b*.

A seat central axis 128*b* of the aircraft seat 56*b* of the aircraft seat device 46*b*, when viewed perpendicularly to the aircraft cabin floor 22*b*, intersects the further seat base 90*b* of the further aircraft seat 88*b* of the further aircraft seat device 48*b* (FIG. 7). The seat central axis 128*b* of the aircraft seat 56*b* is aligned so as to be parallel to a further seat central axis 130*b* of the further aircraft seat 88*b* of the further aircraft seat device 48*b*. The seat central axis 128*b* and the further seat central axis 130*b* in the present case, when viewed perpendicularly to the aircraft cabin floor 22*b*, are mutually spaced apart. In principle, it would also be conceivable that the seat central axis 128*b* of the aircraft seat 56*b* of the aircraft seat device 46*b* and the further seat central axis 130*b* of the further aircraft seat 88*b* of the further aircraft seat device 48*b* are disposed in a plane which is aligned so as to be perpendicular to the aircraft cabin floor 22*b*. The seat central axis 128*b* of the aircraft seat 56*b* of the aircraft seat device 46*b* intersects the aircraft cabin central axis 16*b* in an intersection point which, when viewed in the flight direction 24*b*, lies behind an intersection point of the further seat central axis 130*b* of the further aircraft seat 88*b* of the further aircraft seat device 48*b* and the aircraft cabin central axis 16*b*.

The aircraft seat device 46*b* has a foot space 132*b* (FIG. 9). The foot space 132*b* in the lying position of the aircraft seat device 46*b* is provided for resting at least one foot. The foot space 132*b* of the aircraft seat device 46*b* is disposed in the console 68*b* of the aircraft seat device 46*b*. The console 68*b* configures the foot space 132*b*. The foot space 132*b* of the aircraft seat device 46*b* is utilizable exclusively by a passenger that is accommodated in the aircraft seat region of the aircraft seat device 46*b*. The aircraft seat device 46*b* has a footrest and/or leg rest element 134*b*. The footrest and/or leg rest element 134*b* of the aircraft seat device 46*b* is disposed so as to be at least substantially in the foot space 132*b* of the aircraft seat device 46*b*.

The further aircraft seat device 48*b* has a further foot space 136*b* (FIG. 9). The further foot space 136*b* in the lying position of the further aircraft seat device 48*b* is provided for resting at least one foot. The further foot space 136*b* of the further aircraft seat device 48*b* is disposed in the further console 100*b* of the further aircraft seat device 48*b*. The further console 100*b* configures the further foot space 136*b*. The further foot space 136*b* of the further aircraft seat device 48*b* is utilizable exclusively by a passenger that is accommodated in the further aircraft seat region of the further aircraft seat device 48*b*. The further aircraft seat device 48*b* has a further footrest and/or leg rest element 138*b*. The further footrest and/or leg rest element 138*b* of the further aircraft seat device 48*b* is disposed so as to be at least substantially in the further foot space 136*b* of the further aircraft seat device 48*b*. The foot space 132*b* of the aircraft seat device 46*b* and the further foot space 136*b* of the further aircraft seat device 48*b*, when viewed perpendicularly to the aircraft cabin floor 22*b*, are disposed so as to overlap. The foot space 132*b* of the aircraft seat device 46*b* is disposed between the aircraft cabin floor 22*b* and the further foot space 136*b* of the further aircraft seat device 48*b*.

The aircraft seat 56*b* and the further aircraft seat 88*b* in FIG. 9 are shown in the lying position, wherein the aircraft seat 56*b* and the further aircraft seat 88*b* are illustrated in the sitting position with dashed lines. The aircraft seat device 46*b* in the lying position of the aircraft seat device 46*b* implements a lying plane 140*b* which from the aircraft cabin floor 22*b* has a different spacing than a further lying plane 142*b* which is implemented by the further aircraft seat device 48*b* in the lying position of the further aircraft seat device 48*b*. In the present case, the further lying plane 142*b* has a smaller minimum spacing from the aircraft cabin floor 22*b* than the lying plane 140*b*. Alternatively, it would be conceivable for the further lying plane 142*b* to have a larger minimum spacing from the aircraft cabin floor 22*b* than the lying plane 140*b*. A minimum spacing between the lying plane 140*b* and the further lying plane 142*b*, measured perpendicularly to the aircraft cabin floor 22*b*, is at least 25 cm. A surface of the backrest 60*b* of the aircraft seat 56*b* of the aircraft seat device 46*b*, a surface of the seat base 58*b* of the aircraft seat 56*b* of the aircraft seat device 46*b*, and a surface of the footrest and/or leg rest element 134*b* of the aircraft seat device 46*b* configure the lying plane 140*b*. In the lying position, the surface of the backrest 60*b*, the surface of the seat base 58*b*, and the surface of the footrest and/or leg rest element 134*b* face away from the aircraft cabin floor 22*b*. The seat base 58*b* of the aircraft seat 56*b* of the aircraft seat device 46*b*, when being transferred from the sitting position to the lying position, is provided to be lowered toward the aircraft cabin floor 22*b*. Alternatively, it would be conceivable that the seat base 58*b* of the aircraft seat 56*b* of the aircraft seat device 46*b*, when being transferred from the sitting position to the lying position, is provided to be raised from the aircraft cabin floor 22*b*. A surface of the further backrest 92*b* of the further aircraft seat 88*b* of the further aircraft seat device 48*b*, a surface of the further seat base 90*b* of the further aircraft seat 88*b* of the further aircraft seat device 48*b*, and a surface of the further footrest and/or leg rest element 138*b* of the further aircraft seat device 48*b* configure the further lying plane 142*b*. In the lying position, the surface of the further backrest 92*b*, the surface of the further seat base 90*b*, and the surface of the further footrest and/or leg rest element 138*b* face away from the aircraft cabin floor 22*b*. The further seat base 90*b* of the further aircraft seat 88*b* of the further aircraft seat device 48*b*, when being transferred from the sitting position to the lying position, is provided to be raised from the aircraft cabin floor 22*b*. Alternatively, it would be conceivable that the further seat base 90*b* of the further aircraft seat 88*b* of the further aircraft seat device 48*b*, when being transferred from the sitting position to the lying position, is provided to be lowered toward the aircraft cabin floor 22*b*.

The aircraft seat device 46*b* and the further aircraft seat device 48*b* comprise a common console 144*b*. The console 68*b* of the aircraft seat device 46*b* and the further console 100*b* of the further aircraft seat device 48*b* are integrally configured. The console 68*b* of the aircraft seat device 46*b* and the further console 100*b* of the further aircraft seat device 48*b*, when viewed perpendicularly to the aircraft cabin floor 22*b*, are disposed so as to at least partially overlap. The console 68*b* of the aircraft seat device 46*b* and the further console 100*b* of the further aircraft seat device 48*b* configure the common console 144*b*. The common console 144*b* is configured so as to be cuboid. The common console 144*b* intersects the aircraft cabin central plane. The common console 144*b* is disposed between the aircraft seat 56*b* of the aircraft seat device 46*b* and the further aircraft seat 88*b* of the further aircraft seat device 48*b*. The common console 144*b* is disposed between an adjacent aircraft seat of the adjacent aircraft seat device 46'*b* and an adjacent further aircraft seat of the adjacent further aircraft seat device 48'*b*. The common console 144*b* from the aircraft cabin floor 22*b* has a maximum spacing which is at least 90% of a maximum spacing of the enclosure 66*b* and/or of the further enclosure 98*b* from the aircraft cabin floor 22*b*.

The common console 144*b* is partially utilizable from the adjacent aircraft seat device 46'*b*. The common console 144*b* is partially utilizable from the adjacent further aircraft seat device 48'*b*. The common console 144*b* can be used by the adjacent aircraft seat device 46'*b* and the adjacent further aircraft seat device 48'*b*. An axis which is not illustrated in more detail and is perpendicular to the aircraft cabin central axis 16*b* and parallel to the aircraft cabin floor 22*b* in the first seat column 36*b* intersects the common console 144*b*, the adjacent aircraft seat of the adjacent aircraft seat device 46'*b* in the sitting position, and the adjacent further aircraft seat of the adjacent further aircraft seat device 48'*b* in the sitting position. The adjacent aircraft seat device 46'*b* and the adjacent further aircraft seat device 48'*b* are disposed next to one another in the common first seat column 36*b*.

The common console 144*b* in the present case has two stowage spaces 146*b*, 148*b*. The common console 144*b* has a stowage space 146*b*. The stowage space 146*b* is accessible only from the adjacent aircraft seat device 46'*b*. The stowage space 146*b* is disposed above the foot space 132*b* and the further foot space 136*b*. An axis which is aligned so as to be perpendicular to the aircraft cabin floor 22*b* intersects the foot space 132*b* of the aircraft seat device 46*b*, the further foot space 136*b* of the further aircraft seat device 48*b*, and the stowage space 146*b* of the common console 144*b*. The common console 144*b* has a further stowage space 148*b*. The further stowage space 148*b* is accessible only from the adjacent further aircraft seat device 48'*b*. The further stowage space 148*b* is disposed above the foot space 132*b* and the further foot space 136*b*. An axis which is aligned so as to be perpendicular to the aircraft cabin floor 22*b* intersects the foot space 132*b* of the aircraft seat device 46*b*, the further foot space 136*b* of the further aircraft seat device 48*b*, and the further stowage space 148*b* of the common console 144*b*. A separation of the common console 144*b*, which is not illustrated in more detail, is disposed between the stowage space 146*b* and the further stowage space 148*b*.

A plurality of alternative aircraft seat devices, which are configured so as to be at least substantially identical to the aircraft seat device 46*b* but by way of an aircraft longitudinal axis are mirror-imaged to the latter, are disposed in the second seat column 40*b*. The plurality of alternative aircraft seat devices in the second seat column 40*b* have in each case direct access to the same aircraft cabin aisle 32*b*. A plurality of other aircraft seat devices, which are configured so as to be at least substantially identical to the aircraft seat device 46*b*, are disposed in the third seat column 42*b*. The above-described features for the aircraft seat device 46*b* in the first seat column 36*b* fundamentally also apply to the third seat column 42*b*. The plurality of other aircraft seat devices in the third seat column 42*b* have in each case direct access to the same further aircraft cabin aisle 34*b*.

In principle, the aircraft seat assembly 14*b* illustrated in FIG. 6 is not limited to the number of aircraft seat devices shown. The aircraft seat assembly 14*b* here may have fewer or more aircraft seat devices than illustrated. In principle, it would also be conceivable that the aircraft seat assembly 14b shown in FIG. 6 entirely or partially, preferably at least one of the seat columns 36b, 40b, 42b, is disposed so as to be mirror-imaged about an axis in the aircraft cabin 12b, wherein the axis is aligned so as to be perpendicular to the aircraft cabin central axis 16b and parallel to the aircraft cabin floor 22b.

Figure 10:
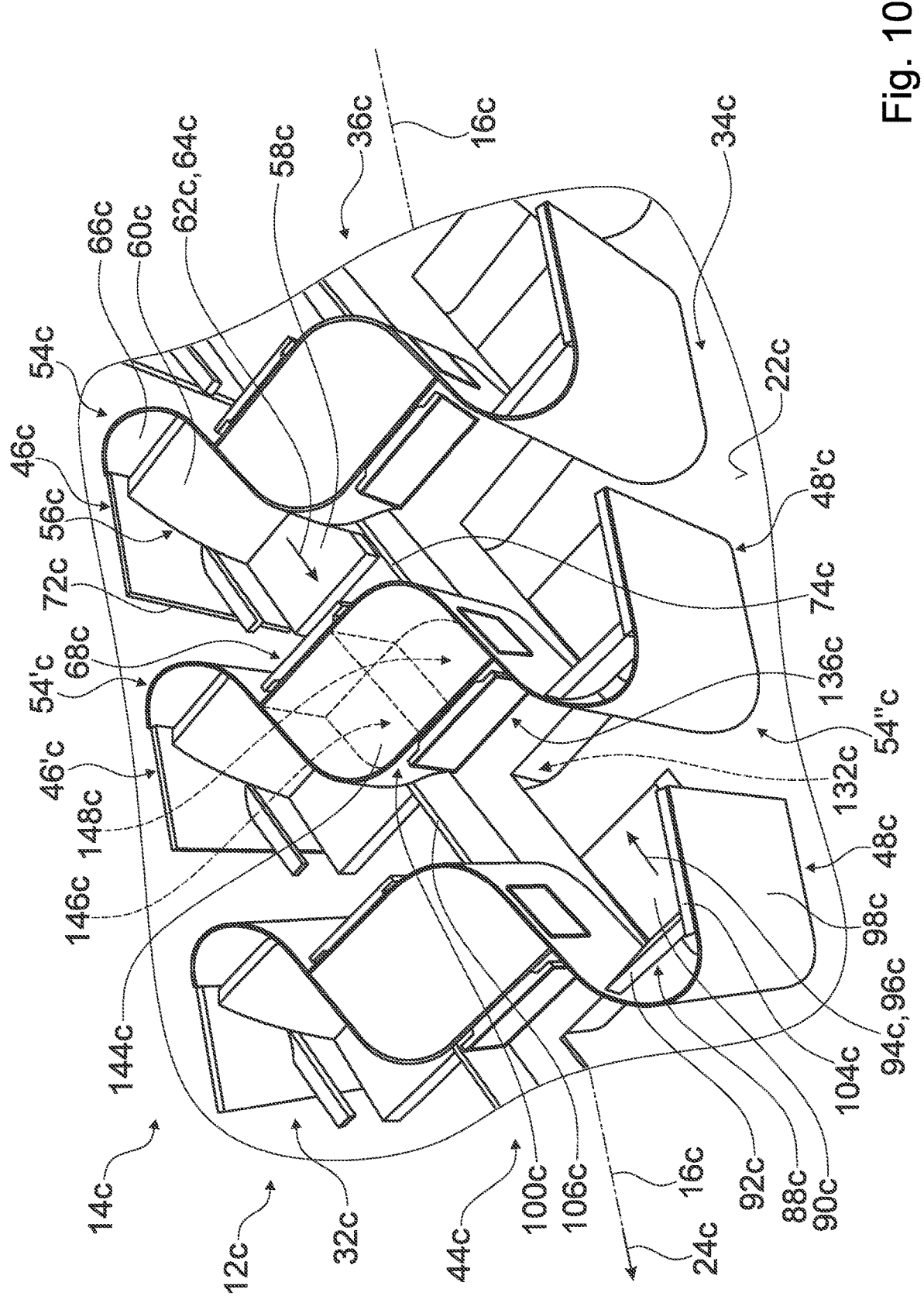
FIG. 10 shows a perspective view of an aircraft seat assembly according to the invention in a 30 schematic illustration, in a third exemplary embodiment.

An aircraft seat assembly 14c in a third exemplary embodiment is shown in FIG. 10. The third exemplary embodiment is similar to the second exemplary embodiment. The aircraft seat assembly 14c is provided for use in a partially illustrated aircraft cabin 12c of an aircraft. The aircraft cabin 12c has an aircraft cabin central axis 16c. The aircraft cabin 12c has an aircraft cabin floor 22c. The aircraft cabin 12c has an aircraft cabin central plane which is not illustrated in more detail. The aircraft in at least one operating state has a flight direction 24c. The flight direction 24c in the present case is aligned in an idealized manner so as to be parallel to the aircraft cabin central axis 16c. The aircraft cabin 12c has an aircraft cabin aisle 32c. The aircraft cabin 12c has a further aircraft cabin aisle 34c. In the present case, the aircraft seat assembly 14c comprises three seat columns. The aircraft seat assembly 14c comprises a first seat column 36c. The first seat column 36c is configured as an inner seat column. The aircraft cabin 12c has a central region 44c. The first seat column 36c is disposed in the central region 44c. The aircraft seat assembly 14c comprises a second seat column which is not illustrated in more detail. The second seat column can be configured so as to be identical to the second seat column 40b from the second exemplary embodiment. The aircraft seat assembly 14c comprises a third seat column which is not illustrated in more detail. The third seat column can be configured so as to be identical to the third seat column 42b from the second exemplary embodiment.

The aircraft seat assembly 14c comprises an aircraft seat device 46c. The aircraft seat device 46c is disposed in the first seat column 36c. The aircraft seat assembly 14c comprises a further aircraft seat device 48c. The further aircraft seat device 48c is disposed in the first seat column 36c. The aircraft seat device 46c and the further aircraft seat device 48c are disposed so as to be at least partially adjacent in a common seat column, specifically the first seat column 36c. The aircraft seat assembly 14c comprises an adjacent aircraft seat device 46'c. The adjacent aircraft seat device 46'c is configured so as to be at least substantially identical to the aircraft seat device 46c. The adjacent aircraft seat device 46'c is disposed in the first seat column 36c. The aircraft seat assembly 14c comprises an adjacent further aircraft seat device 48'c. The adjacent further aircraft seat device 48'c is configured so as to be at least substantially identical to the further aircraft seat device 48c. The adjacent further aircraft seat device 48'c is disposed in the first seat column 36c. The aircraft seat device 46c and the further aircraft seat device 48c configure a seat group 54c of the aircraft seat assembly 14c. In the present case, the aircraft seat assembly 14c comprises at least three seat groups 54c, 54'c, 54"c which are disposed directly behind one another in the first seat column 36c and in each case are formed from the aircraft seat device 46c and the further aircraft seat device 48c. The aircraft seat device 46c configures an aircraft seat region. The aircraft seat device 46c has an aircraft seat 56c. The aircraft seat 56c is configured as a fully-flat seat. The aircraft seat 56c comprises a seat base 58c. The aircraft seat 56c comprises a backrest 60c. The aircraft seat device 46c is adjustable between a sitting position and a lying position. The aircraft seat device 46c in FIG. 10 is shown in the sitting position.

The aircraft seat device 46c has a sitting direction 62c. The aircraft seat device 46c has a lying direction 64c. The sitting direction 62c corresponds to the lying direction 64c. The lying direction 64c of the aircraft seat device 46c has a directional component in the flight direction 24c. The lying direction 64c of the aircraft seat device 46c is aligned so as to be angled in relation to the aircraft cabin central axis 16c by at least 25 degrees. The aircraft seat device 46c has an enclosure 66c. The aircraft seat device 46c has a console 68c. The console 68c is utilizable by two aircraft seat devices which are disposed so as to be directly mutually adjacent, specifically the aircraft seat device 46c and the further aircraft seat device 48c. The console 68c intersects the aircraft cabin central plane. The aircraft seat device 46c in the present case has two partition units 72c, 74c. A first partition unit 72c of the aircraft seat device 46c in at least one operating state is provided for visually separating the aircraft seat region from the aircraft cabin aisle 32c. The aircraft seat device 46c has direct access to the aircraft cabin aisle 32c. The further aircraft seat device 48c configures a further aircraft seat region. The further aircraft seat device 48c has a further aircraft seat 88c. The further aircraft seat 88c is configured as a fully-flat seat. The further aircraft seat 88c comprises a further seat base 90c. The further aircraft seat 88c comprises a further backrest 92c. The further aircraft seat device 48c is adjustable between a sitting position and a lying position. The further aircraft seat device 48c in FIG. 10 is shown in the sitting position. The further aircraft seat device 48c has a further sitting direction 94c. The sitting direction 62c of the aircraft seat device 46c is aligned so as to be counter to the further sitting direction 94c of the further aircraft seat device 48c. The further aircraft seat device 48c has a further lying direction 96c. The lying direction 64c of the aircraft seat device 46c is aligned so as to be counter to the further lying direction 96c of the further aircraft seat device 48c. The further sitting direction 94c corresponds to the further lying direction 96c. The further lying direction 96c of the further aircraft seat device 48c has a directional component counter to the flight direction 24c. The further lying direction 96c of the further aircraft seat device 48c is aligned so as to be angled in relation to the aircraft cabin central axis 16c by at least 25 degrees. The further aircraft seat device 48c has a further enclosure 98c. The further aircraft seat device 48c has a further console 100c. The further console 100c intersects the aircraft cabin central plane. The further console 100c is utilizable by two aircraft seat devices which are disposed so as to be directly mutually adjacent, specifically the aircraft seat device 46c and the further aircraft seat device 48c. The further aircraft seat device 48c in the present case has two further partition units 104b, 106c. A first further partition unit 104c of the further aircraft seat device 48c in at least one operating state is provided for visually separating the further aircraft seat region from the further aircraft cabin aisle 34c. The further aircraft seat device 48c has direct access to the further aircraft cabin aisle 34c.

The aircraft seat device 46c and the further aircraft seat device 48c comprise a common console 144c. The console 68c of the aircraft seat device 46c and the further console 100c of the further aircraft seat device 48c are integrally configured. The console 68c of the aircraft seat device 46c and the further console 100c of the further aircraft seat device 48c, when viewed perpendicularly to the aircraft cabin floor 22c, are disposed so as to at least partially overlap. The console 68c of the aircraft seat device 46c and the further console 100c of the further aircraft seat device 48c configure the common console 144c. An axis which is not illustrated in more detail and is perpendicular to the aircraft cabin central axis 16*c* and parallel to the aircraft cabin floor 22*c*, in the first seat column 36*c* intersects the common console 144*c*, an adjacent aircraft seat of the adjacent aircraft seat device 46'*c* in the sitting position, and an adjacent further aircraft seat of the adjacent further aircraft seat device 48'*c* in the sitting position.

The aircraft seat device 46*c* has a foot space 132*c*. The further aircraft seat device 48*c* has a further foot space 136*c*. The foot space 132*c* of the aircraft seat device 46*c* and the further foot space 136*c* of the further aircraft seat device 48*c*, when viewed perpendicularly to the aircraft cabin floor 22*c*, are disposed so as to overlap. The aircraft seat device 46*c* in the lying position of the aircraft seat device 46*c* implements a lying plane which is not illustrated in more detail and from the aircraft cabin floor 22*c* has a different spacing than a further lying plane which is not illustrated in more detail and is implemented by the further aircraft seat device 48*c* in the lying position of the further aircraft seat device 48*c*. The seat base 58*c* of the aircraft seat 56*c* of the aircraft seat device 46*c*, when being transferred from the sitting position to the lying position, is provided to be lowered toward the aircraft cabin floor 22*c*. The further seat base 90*c* of the further aircraft seat 88*c* of the further aircraft seat device 48*c*, when being transferred from the sitting position to the lying position, is provided to be raised from the aircraft cabin floor 22*c*.

The sitting direction 62*c* of the aircraft seat device 46*c* is configured so as to be at least substantially parallel to the further sitting direction 94*c* of the further aircraft seat device 48*c*. The lying direction 64*c* of the aircraft seat device 46*c* is configured so as to be at least substantially parallel to the further lying direction 96*c* of the further aircraft seat device 48*c*. The lying direction 64*c* and the further lying direction 96*c* are aligned in an idealized manner to the aircraft seat device 46*c* and the further aircraft seat device 48*c*, wherein an actual lying direction defined by a passenger, preferably by virtue of an asymmetrical posture of the passenger, may deviate from the lying direction 64*c* and/or from the further lying direction 96*c*.

A seat central axis of the aircraft seat 56*c* of the aircraft seat device 46*c*, which is not illustrated in more detail, and a further seat central axis of the further aircraft seat 88*c* of the further aircraft seat device 48*c*, which is not illustrated in more detail, in the present case, when viewed perpendicularly to the aircraft cabin floor 22*c*, are mutually spaced apart. The seat central axis of the aircraft seat 56*c* of the aircraft seat device 46*c* and the further seat central axis of the further aircraft seat 88*c* of the further aircraft seat device 48*c* are aligned so as to be parallel.

As opposed to the second exemplary embodiment, a spacing between the seat central axis of the aircraft seat 56*c* of the aircraft seat device 46*c* and the further seat central axis of the further aircraft seat 88*c* of the further aircraft seat device 48*c* is larger than in the second exemplary embodiment. In the present case, an axis which is not illustrated in more detail and is aligned so as to be parallel to the sitting direction 62*c* and/or the lying direction 64*c* of the aircraft seat device 46*c*, intersects the aircraft seat 56*c* of the aircraft seat device 46*c* and the further aircraft seat 88*c* of the further aircraft seat device 48*c*. Alternatively, it would be conceivable for the aircraft seat 56*c* of the aircraft seat device 46*c* and the further aircraft seat 88*c* of the further aircraft seat device 48*c* not to have a common sectional axis which is aligned so as to be parallel to the sitting direction 62*c* and/or the lying direction 64*c* of the aircraft seat device 46*c*.

In the present case, the common console 144*c* is configured so as to be cuboid, wherein, when viewed perpendicularly to the aircraft cabin floor 22*c*, two mutually opposite corners of the common console 144*c* are in each case radiused by a radius of at least 10 cm. The radius of the radiusing extends parallel to the aircraft cabin floor 22*c*. When viewed perpendicularly to the aircraft cabin floor 22*c*, the common console 144*c*, an enclosure of the adjacent aircraft seat device 46'*c*, and a further enclosure of the adjacent further aircraft seat device 48'*c* configure a shape which substantially corresponds to a shape of a section sign.

The common console 144*c* is partially utilizable from the adjacent aircraft seat device 46'*c*. The common console 144*c* is partially utilizable from the adjacent further aircraft seat device 48'*c*. An axis, which is not illustrated in more detail and is perpendicular to the aircraft cabin central axis 16*c* and parallel to the aircraft cabin floor 22*c*, in the first seat column 36*c* intersects the common console 144*c*, the adjacent aircraft seat of the adjacent aircraft seat device 46'*c* in the sitting position and the adjacent further aircraft seat of the adjacent further aircraft seat device 48'*c* in the sitting position. The common console 144*c* in the present case has two stowage spaces 146*c*, 148*c*. The two stowage spaces 146*c*, 148*c* are configured similar to the stowage spaces 146*b*, 148*b* from the second exemplary embodiment. The two stowage spaces 146*c*, 148*c* are in each case able to be closed by means of a closure element. As a result, it can be advantageously avoided that items fall out. The closure elements can be configured, for example, as a flap, as a sliding door, as a folding blind or as a curtain. A separation of the common console 144*c*, which is not illustrated in more detail, is disposed between the stowage space 146*c* and the further stowage space 148*c*.

A second partition unit 74*c* of the aircraft seat device 46*c* in at least one operating state, when viewed perpendicularly to the aircraft cabin central axis 16*c*, is provided for visually separating the aircraft seat region from an adjacent further aircraft seat region of the adjacent further aircraft seat device 48'*c*. The second partition unit 74*c* of the aircraft seat device 46*c* is configured so as to be adjustable. The second partition unit 74*c* is provided for filling a void between the enclosure 66*c* and the console 68*c*. The second partition unit 74*c* of the aircraft seat device 46*c* is coupled to the console 68*c*. The second partition unit 74*c* of the aircraft seat device 46*c* is configured so as to be at least partially integral to a second further partition unit of the adjacent further aircraft seat device 48'*c*.

A second further partition unit 106*c* of the further aircraft seat device 48*c* in at least one operating state, when viewed perpendicularly to the aircraft cabin central axis 16*c*, is provided for visually separating the further aircraft seat region from an adjacent aircraft seat region of the adjacent aircraft seat device 46'*c*. The second further partition unit 106*c* of the further aircraft seat device 48*c* is configured so as to be adjustable. The second further partition unit 106*c* is provided for filling a further void between the further enclosure 98*c* and the further console 100*c*. The second further partition unit 106*c* of the further aircraft seat device 48*c* is coupled to the further console 100*c*. The second further partition unit 106*c* of the further aircraft seat device 48*c* is configured so as to be at least partially integral to a second partition unit of the adjacent aircraft seat device 46'*c*.

In principle, the aircraft seat assembly 14*c* illustrated in FIG. 10 is not limited to the number of aircraft seat devices shown. The aircraft seat assembly 14*c* here may have fewer or more than the aircraft seat devices illustrated. In principle, it would also be conceivable for the aircraft seat assembly 14c shown in FIG. 10 in the first seat column 36c to be disposed so as to be mirror-imaged about the aircraft cabin central axis 16c in the aircraft cabin 12c.

Figure 11:
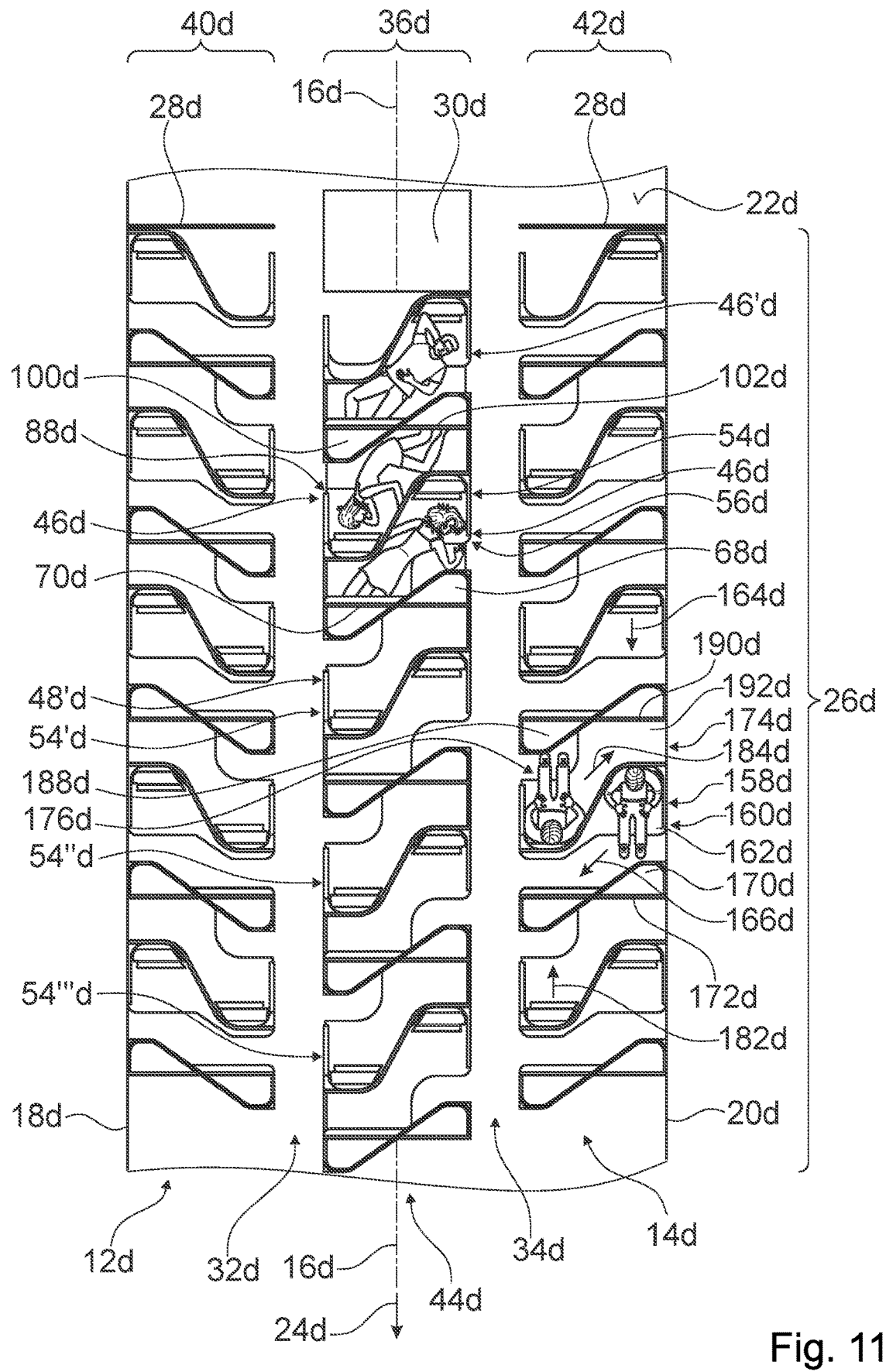
FIG. 11 shows an aircraft seat assembly according to the invention in a schematic illustration, in a fourth exemplary embodiment.
Figure 12:
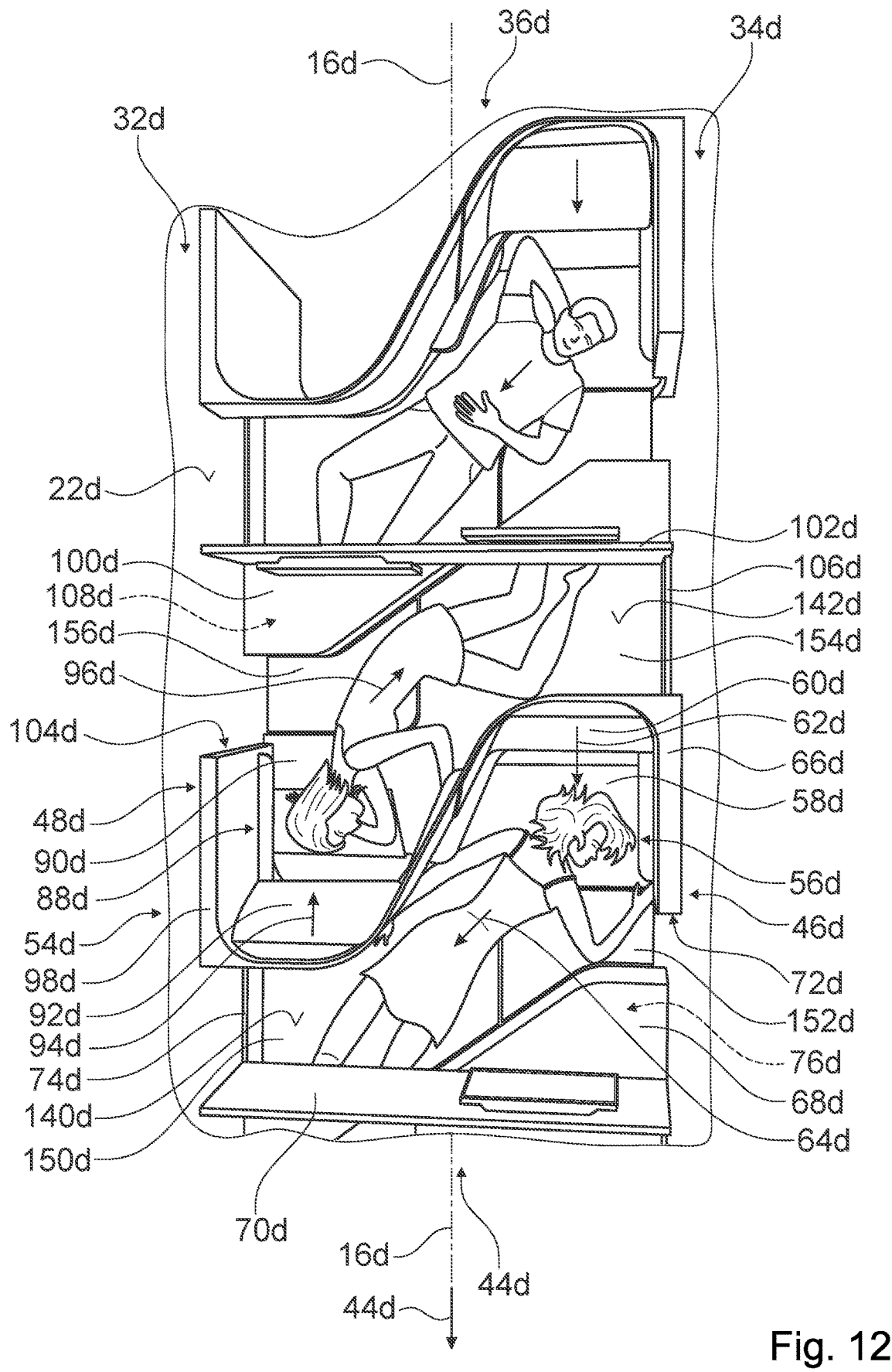
FIG. 12 shows a fragment of the aircraft seat assembly according to the invention from FIG. 11, in a schematic illustration in the fourth exemplary embodiment.
Figure 13:
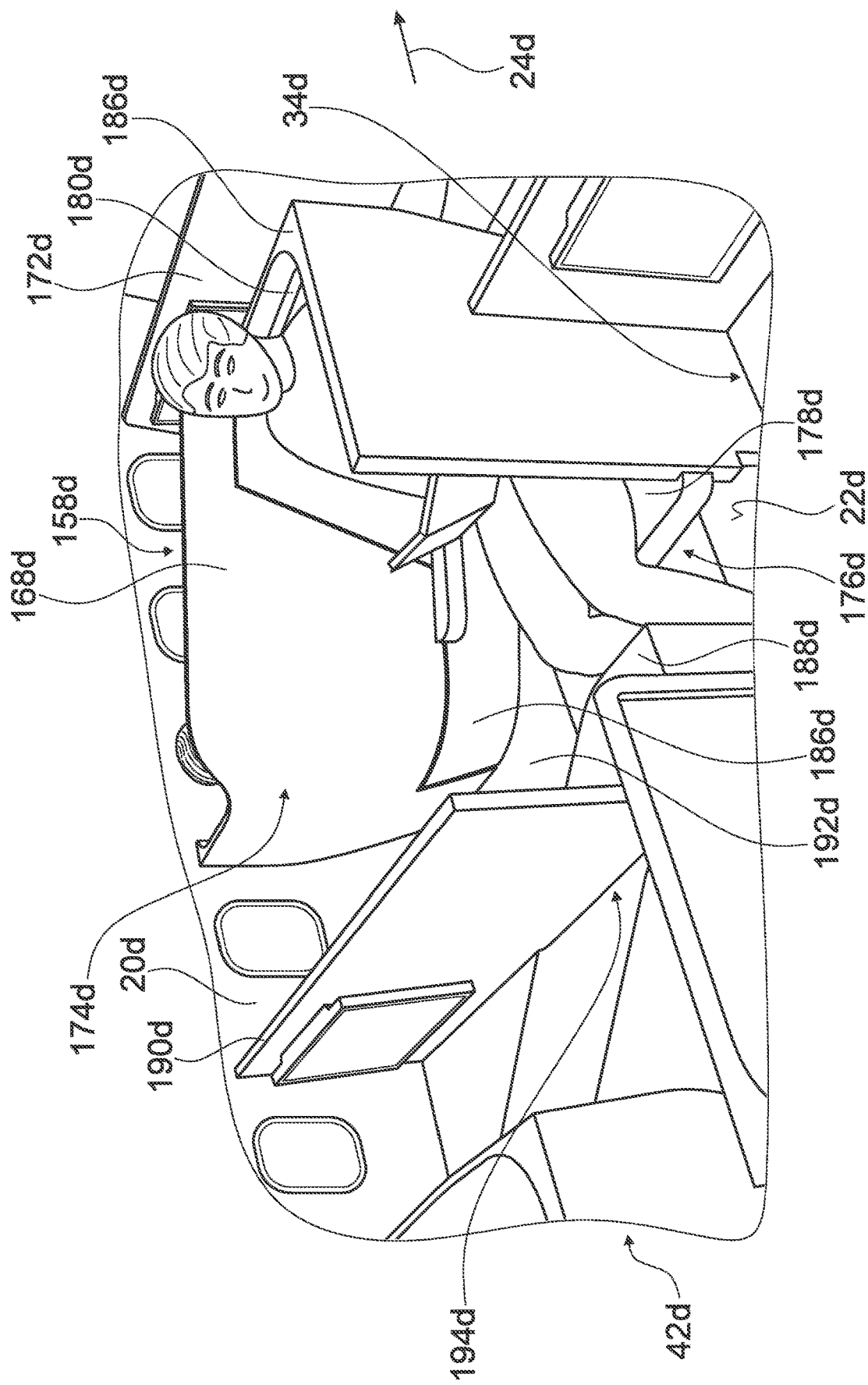
FIG. 13 shows a perspective view of the aircraft seat assembly according to the invention from FIG. 11, in a schematic illustration in the fourth exemplary embodiment.

FIGS. 11 to 13 show an aircraft seat assembly 14d in a fourth exemplary embodiment. The aircraft seat assembly 14d is provided for use in a partially illustrated aircraft cabin 12d of an aircraft. The aircraft cabin 12d has an aircraft cabin central axis 16d. The aircraft cabin central axis 16d is configured as an aircraft longitudinal axis. The aircraft cabin central axis 16d has an identical spacing from each of the mutually opposite aircraft cabin external walls 18d, 20d of the aircraft cabin 12d. The aircraft cabin central axis 16d is aligned so as to be parallel to an aircraft cabin floor 22d of the aircraft cabin 12d. The aircraft cabin 12d has an aircraft cabin central plane which is not illustrated in more detail. The aircraft in at least one operating state has a flight direction 24d. The flight direction 24d in the present case is aligned in an idealized manner so as to be parallel to the aircraft cabin central axis 16d. The aircraft cabin 12d along the aircraft cabin central axis 16d has an aircraft cabin portion 26d. The aircraft cabin portion 26d in the present case is delimited by a plurality of aircraft cabin partition elements 28d and by a plurality of schematically illustrated aircraft cabin modules 30d along the aircraft cabin central axis 16d. The aircraft cabin 12d in the aircraft cabin portion 26d has two aircraft cabin aisles 32d, 34d. The aircraft cabin 12d has an aircraft cabin aisle 32d. The aircraft cabin 12d has a further aircraft cabin aisle 34d.

In the present case, the aircraft seat assembly 14d comprises three seat columns 36d, 40d, 42d. The aircraft seat assembly 14d comprises a first seat column 36d. The first seat column 36d is configured as an inner seat column. The aircraft cabin 12d has a central region 44d. The central region 44d is delimited by the two aircraft cabin aisles 32d, 34d. The first seat column 36d is disposed in the central region 44d. A maximum extent of the first seat column 36d, measured perpendicularly to the aircraft cabin central axis 16d and parallel to the aircraft cabin floor 22d, corresponds to a minimum spacing between the aircraft cabin aisle 32d and the further aircraft cabin aisle 34d. The first seat column 36d, when viewed perpendicularly to the aircraft cabin central axis 16d and parallel to the aircraft cabin floor 22d, at least substantially completely fills the central region 44d. The aircraft seat assembly 14d comprises a second seat column 40d. The second seat column 40d is configured as a first outer seat column. The aircraft seat assembly 14d comprises a third seat column 42d. The third seat column 42d is configured as a second outer seat column. In the present case, the third seat column 42d by way of the aircraft cabin central axis 16d is configured so as to be symmetrical to the second seat column 40d. In principle, the third seat column 42d could also be configured so as to be identical to the second seat column 40d.

The aircraft seat assembly 14d comprises an aircraft seat device 46d. The aircraft seat device 46d is disposed in the first seat column 36d. The aircraft seat device 46d intersects the aircraft cabin central plane. The aircraft seat assembly 14d comprises a further aircraft seat device 48d. The further aircraft seat device 48d is disposed in the first seat column 36d. The further aircraft seat device 48d intersects the aircraft cabin central plane. The aircraft seat device 46d and the further aircraft seat device 48d are disposed so as to be at least partially next to one another in a common seat column, specifically the first seat column 36d. Exactly two aircraft seat devices are disposed directly next to one another in the common first seat column 36d, specifically the aircraft seat device 46d and the further aircraft seat device 48d. The aircraft seat device 46d and the further aircraft seat device 48d, when viewed perpendicularly to the aircraft cabin central axis 16d, are disposed so as to at least partially overlap in the first seat column 36d. The aircraft seat device 46d and the further aircraft seat device 48d are disposed so as to be directly adjacent to one another in the first seat column 36d. The aircraft seat device 46d and the further aircraft seat device 48d are disposed so as to be directly behind one another and directly next to one another in the first seat column 36d. The aircraft seat device 46d and the further aircraft seat device 48d have in each case direct access to different aircraft cabin aisles 32d, 34d.

The aircraft seat assembly 14d comprises an adjacent aircraft seat device 46'd. The adjacent aircraft seat device 46'd is configured so as to be at least substantially identical to the aircraft seat device 46d. The adjacent aircraft seat device 46'd is disposed in the first seat column 36d. The adjacent aircraft seat device 46'd is disposed so as to be adjacent to the further aircraft seat device 48d along an aircraft longitudinal axis. The adjacent aircraft seat device 46'd, when viewed in the flight direction 24d, is disposed directly in front of the further aircraft seat device 48d. The adjacent aircraft seat device 46'd is spaced apart from the aircraft seat device 46d by the further aircraft seat device 48d.

The aircraft seat assembly 14d comprises an adjacent further aircraft seat device 48'd. The adjacent further aircraft seat device 48'd is configured so as to be at least substantially identical to the further aircraft seat device 48d. The adjacent further aircraft seat device 48'd is disposed in the first seat column 36d. The adjacent further aircraft seat device 48'd is disposed so as to be adjacent to the aircraft seat device 46d along an aircraft longitudinal axis. The adjacent further aircraft seat device 48'd, when viewed in the flight direction 24d, is disposed directly behind the aircraft seat device 46d. The adjacent further aircraft seat device 48'd is spaced apart from the further aircraft seat device 48d by the aircraft seat device 46d.

The aircraft seat device 46d and the further aircraft seat device 48d configure a seat group 54d of the aircraft seat assembly 14d. The seat group 54d configures a, preferably periodically, repeatable sequence. In the present case, the aircraft seat assembly 14d comprises four seat groups 54d, 54'd, 54"d, 54'''d which are disposed directly behind one another in the first seat column 36d and are in each case formed from the aircraft seat device 46d and the further aircraft seat device 48d. The four seat groups 54d, 54'd, 54"d, 54'''d which are disposed directly behind one another in the first seat column 36d are configured so as to be identical. The aircraft seat device 46d and the further aircraft seat device 48d, preferably when viewed perpendicularly to the aircraft cabin floor 22d, conjointly implement an at least substantially rectangular base area. The at least substantially rectangular base area defines the seat group 54d.

The aircraft seat device 46d configures an aircraft seat region. The aircraft seat device 46d has an aircraft seat 56d. In the present case, the aircraft seat 56d is not configured as a fully-flat seat. The aircraft seat 56d comprises a seat base 58d. The aircraft seat 56d comprises a backrest 60d. In principle, the aircraft seat 56d may comprise additional add-on parts such as preferably a headrest, a leg rest and/or at least one armrest. The aircraft seat device 46d is adjustable between a sitting position and a lying position. The aircraft seat device 46d in FIGS. 11 and 12 is shown in the lying position. The adjacent aircraft seat device 46'd in FIG. 11 is shown in the sitting position. The aircraft seat 56d of the aircraft seat device 46d in the sitting position and in the lying position is disposed at the same position. The aircraft seat 56d of the aircraft seat device 46d is configured so as to be non-adjustable in one alignment. The aircraft seat 56d of the aircraft seat device 46d is configured so as to be rotationally fixed in terms of a movement about an axis perpendicular to the aircraft cabin floor 22d. The seat base 58d of the aircraft seat 56d of the aircraft seat device 46d in the sitting position and in the lying position is disposed at the same position. The seat base 58d of the aircraft seat 56d is disposed so as to be stationary in the aircraft seat region of the aircraft seat device 46d. The seat base 58d of the aircraft seat 56d of the aircraft seat device 46d is disposed at the same location in the sitting position and in the lying position of the aircraft seat device 46d. The seat base 58d of the aircraft seat 56d of the aircraft seat device 46d is configured so as to be non-adjustable in one position. In principle, it is conceivable that the backrest 60d of the aircraft seat 56d is mounted so as to be movable in relation to the seat base 58d of the aircraft seat 56d. The aircraft seat device 46d has a sitting direction 62d. The sitting direction 62d of the aircraft seat device 46d is aligned so as to be at least substantially parallel to the aircraft cabin central axis 16d. The sitting direction 62d corresponds to the flight direction 24d. The aircraft seat device 46d has a lying direction 64d. When viewed perpendicularly to the aircraft cabin floor 22d, the lying direction 64d differs from the sitting direction 62d by an angle of at least 30 degrees. In the present case, the sitting direction 62d of the aircraft seat device 46d deviates from the lying direction 64d of the aircraft seat device 46d by at least 30 degrees. The lying direction 64d of the aircraft seat device 46d has a directional component in the flight direction 24d. The lying direction 64d of the aircraft seat device 46d is aligned so as to be angled in relation to the aircraft cabin central axis 16d by at least 30 degrees. The lying direction 64d of the aircraft seat device 46d is directed away from the further aircraft cabin aisle 34d. The aircraft seat device 46d has an enclosure 66d. The enclosure 66d is configured as a shell element. The aircraft seat device 46d has a console 68d. The console 68d is utilizable by two aircraft seat devices which are disposed so as to be directly mutually adjacent, specifically the aircraft seat device 46d and the adjacent further aircraft seat device 48'd. The console 68d intersects the aircraft cabin central plane. The aircraft seat device 46d has a partition wall 70d. The partition wall 70d of the aircraft seat device 46d, when viewed in the sitting direction 62d, is disposed behind the aircraft seat 56d. A direction of main extent of the partition wall 70d of the aircraft seat device 46d runs perpendicularly to the aircraft cabin central axis 16d. The partition wall 70d is configured so as to be continuous between the aircraft cabin aisle 32d and the further aircraft cabin aisle 34d. The partition wall 70d of the aircraft seat device 46d is provided for permanently visually separating the aircraft seat region of the aircraft seat device 46d from the adjacent further aircraft seat region of the adjacent further aircraft seat device 48'd. In principle, it would be conceivable that the partition wall 70d is configured so as to be adjustable and, for example, movable toward the aircraft cabin floor 22d. The partition wall 70d of the aircraft seat device 46d is configured so as to be integral to a partition wall of the adjacent further aircraft seat device 48'd. The aircraft seat device 46d has a display screen. The display screen is disposed on the partition wall 70d. The aircraft seat device 46d has a foot space 76d. The foot space 76d in the lying position of the adjacent further aircraft seat device 48'd is provided for resting at least one foot. The foot space 76d of the aircraft seat device 46d is disposed in the console 68d of the aircraft seat device 46d. The console 68d configures the foot space 76d. The foot space 76d of the console 68d of the aircraft seat device 46d is usable exclusively by a passenger that is accommodated in an adjacent further aircraft seat region of the adjacent further aircraft seat device 48'd. The console 68d, proceeding from the partition wall 70d, is configured so as to be self-supporting in the direction of the aircraft seat 56d. Configured between the aircraft cabin floor 22d and the console 68d is a foot space of the aircraft seat device 46d, which is not illustrated in more detail and in which feet of the passenger in the sitting position can be positioned. The aircraft seat device 46d in the present case has two partition units 72d, 74d. A first partition unit 72d of the aircraft seat device 46d in at least one operating state is provided for visually separating the aircraft seat region from the further aircraft cabin aisle 34d. The first partition unit 72d of the aircraft seat device 46d is configured so as to be adjustable. The first partition unit 72d of the aircraft seat device 46d is coupled to the enclosure 66d. A second partition unit 74d of the aircraft seat device 46d in at least one operating state is provided for visually separating the aircraft seat region from the aircraft cabin aisle 32d. The second partition unit 72d of the aircraft seat device 46d is configured so as to be adjustable. The aircraft seat device 46d has direct access to the further aircraft cabin aisle 34d. A passenger can directly enter the aircraft seat region of the aircraft seat device 46d from the further aircraft cabin aisle 34d without traversing another aircraft seat region. The direct access of the aircraft seat device 46d is assigned only to the aircraft seat device 46d. The direct access of the aircraft seat device 46d is utilizable only by the aircraft seat device 46d.

The aircraft seat device 46d in a lying position of the aircraft seat device 46d implements a lying plane 140d which to at most 60% is implemented by the aircraft seat 56d of the aircraft seat device 46d. In the present case, the lying plane 140d is configured to at most 40% by the seat base 58d of the aircraft seat 56d of the aircraft seat device 46d. The aircraft seat device 46d has two comfort elements 150d, 152d. A first comfort element 150d of the aircraft seat device 46d partially configures a bed surface. The first comfort element 150d, when viewed in the sitting direction 62d, is disposed next to the seat base 58d of the aircraft seat 56d. The lying plane 140d is configured to at least 50% by the first comfort element 150d of the aircraft seat device 46d. The first comfort element 150d is configured so as to be integral to the seat base 58d of the aircraft seat 56d of the aircraft seat device 46d. In the present case, the first comfort element 150d of the aircraft seat device 46d is disposed so as to be non-adjustable in the aircraft seat region of the aircraft seat device 46d. In principle, it is conceivable for the first comfort element 150d of the aircraft seat device 46d to protrude beyond the at least substantially rectangular base area. A second comfort element 152d of the aircraft seat device 46d in the lying position partially configures the bed surface. In the lying position, the second comfort element 152d, when viewed in the sitting direction 62d, is disposed directly behind the seat base 58d of the aircraft seat 56d. The second comfort element 152d in the lying position is disposed between the seat base 58d of the aircraft seat 56d and the console 68d. The lying plane 140d to at least 20% is implemented by the second comfort element 152d of the aircraft seat device 46d. The second comfort element 152d is configured so as to be movable in relation to the seat base 58d of the aircraft seat 56d. The second comfort element 152d is configured so as to be movable in relation to the first comfort element 150d. In principle, it is conceivable for the second comfort element 152d in the sitting position to be stowed between the aircraft cabin floor 22d and the first comfort element 150d. Alternatively or additionally, it would be conceivable for the second comfort element 152d in the sitting position to be stowed between the aircraft cabin floor 22d and the seat base 58d of the aircraft seat 56d. In principle, it would also be conceivable for the second comfort element 152d in the sitting position of the aircraft seat device 46d to be stored at another location in the aircraft cabin 12d. A surface of the seat base 58d of the aircraft seat 56d of the aircraft seat device 46d, a surface of the first comfort element 150d of the aircraft seat device 46d, and a surface of the second comfort element 152d of the aircraft seat device 46d configure the lying plane 140d. The surface of the seat base 58d of the aircraft seat 56d, the surface of the first comfort element 150d, and the surface of the second comfort element 152d in the lying position of the aircraft seat device 46d face away from the aircraft cabin floor 22d.

The further aircraft seat device 48d configures a further aircraft seat region. The further aircraft seat device 48d has a further aircraft seat 88d. In the present case, the further aircraft seat 88d is not configured as a fully-flat seat. A minimum spacing of the aircraft seat 56d of the aircraft seat device 46d from the further aircraft cabin aisle 34d has an identical spacing to a minimum further spacing of the further aircraft seat 88d of the further aircraft seat device 48d from the aircraft cabin aisle 32d. The further aircraft seat 88d comprises a further seat base 90d. The further aircraft seat 88d comprises a further backrest 92d. In principle, the further aircraft seat 88d can comprise additional further add-on parts such as preferably a further headrest, a further leg rest and/or at least one further armrest. The further aircraft seat device 48d is adjustable between a sitting position and a lying position. The further aircraft seat device 48d in FIGS. 11 and 12 is shown in the lying position. The adjacent further aircraft seat device 48'd in FIG. 11 is shown in the sitting position. The further aircraft seat 88d of the further aircraft seat device 48d in the sitting position and in the lying position is disposed at the same position. The further aircraft seat 88d of the further aircraft seat device 48d is configured so as to be non-adjustable in one alignment. The further aircraft seat 88d of the further aircraft seat device 48d is configured so as to be rotationally fixed in terms of a movement about an axis perpendicular to the aircraft cabin floor 22d. The further seat base 90d of the further aircraft seat 88d of the further aircraft seat device 48d in the sitting position and in the lying position is disposed at the same position. The further seat base 90d of the further aircraft seat 88d is disposed so as to be stationary in the further aircraft seat region of the further aircraft seat device 48d. In the sitting position and in the lying position of the further aircraft seat device 48d the further seat base 90d of the further aircraft seat 88d of the further aircraft seat device 48d is disposed at the same location. The further seat base 90d of the further aircraft seat 88d of the further aircraft seat device 48d is configured so as to be non-adjustable in one position. In principle, it is conceivable that the further backrest 92d of the further aircraft seat 88d is mounted so as to be movable in relation to the further seat base 90d of the further aircraft seat 88d. The further aircraft seat device 48d has a further sitting direction 94d. The further sitting direction 94d of the further aircraft seat device 48d is aligned so as to be at least substantially parallel to the aircraft cabin central axis 16d. The further sitting direction 94d corresponds to the flight direction 24d. The further aircraft seat device 48d has a further lying direction 96d. The further lying direction 96d, when viewed perpendicularly to the aircraft cabin floor 22d, differs from the further sitting direction 94d by an angle of at least 30 degrees. In the present case, the further sitting direction 94d of the further aircraft seat device 48d deviates from the further lying direction 96d of the further aircraft seat device 48d by at least 30 degrees. The further lying direction 96d of the further aircraft seat device 48d has a directional component in the flight direction 24d. The further lying direction 96d of the further aircraft seat device 48d is aligned so as to be angled in relation to the aircraft cabin central axis 16d by at least 30 degrees. The further lying direction 96d of the further aircraft seat device 48d is directed away from the aircraft cabin aisle 32d. The further aircraft seat device 48d has a further enclosure 98d. The further enclosure 98d is configured as a shell element. The further enclosure 98d of the further aircraft seat device 48d is preferably configured so as to be integral to the enclosure 66d of the aircraft seat device 46d. The further aircraft seat device 48d has a further console 100d. The further console 100d is utilizable by two aircraft seat devices which are disposed so as to be directly mutually adjacent, specifically the further aircraft seat device 48d and the adjacent aircraft seat device 46'd. The further console 100d intersects the aircraft cabin central plane. The further aircraft seat device 48d has a further partition wall 102d. The further partition wall 102d of the further aircraft seat device 48d, when viewed in the sitting direction 94d, is disposed behind the further aircraft seat 88d. A direction of main extent of the further partition wall 102d of the further aircraft seat device 48d runs perpendicularly to the aircraft cabin central axis 16d. The further partition wall 102d is configured so as to be continuous between the aircraft cabin aisle 32d and the further aircraft cabin aisle 34d. The further partition wall 102d of the further aircraft seat device 48d is provided for permanently visually separating the aircraft seat region of the further aircraft seat device 48d from the adjacent aircraft seat region of the adjacent aircraft seat device 46'd. In principle, it would be conceivable that the further partition wall 102d is configured so as to be adjustable and movable toward the aircraft cabin floor 22d, for example. The further partition wall 102d of the further aircraft seat device 48d is configured so as to be integral to a partition wall of the adjacent aircraft seat device 46'd. The further aircraft seat device 48d has a further display screen. The further display screen is disposed on the further partition wall 102d. The further aircraft seat device 48d has a further foot space 108d. The further foot space 108d is provided for resting at least one foot in the lying position of the adjacent aircraft seat device 46'd. The further foot space 108d of the adjacent aircraft seat device 46'd is disposed in the further console 100d of the further aircraft seat device 48d. The further console 100d configures the further foot space 108d. The further foot space 108d of the further console 100d of the further aircraft seat device 48d is utilizable exclusively by a passenger that is accommodated in an adjacent aircraft seat region of the adjacent aircraft seat device 46'd. The foot space 76d of the aircraft seat device 46d and the further foot space 108d of the further aircraft seat device 48d, when viewed along the aircraft cabin central axis 16d, are disposed next to one another. The further console 100d, proceeding from the further partition wall 102d, is configured so as to be self-supporting in the direction of the further aircraft seat 88d. Configured between the aircraft cabin floor 22d and the further console 100d is a further foot space of the further aircraft seat device 48d, which is not illustrated in more detail and in which feet of the passenger in the sitting position can be positioned. The further aircraft seat device 48d in the present case has two further partition units 104d, 106d. A first further partition unit 104d of the further aircraft seat device 48d in at least one operating state is provided for visually separating the further aircraft seat region from the aircraft cabin aisle 32d. The first further partition unit 104d of the further aircraft seat device 48d is configured so as to be adjustable. The first further partition unit 104d of the further aircraft seat device 48d is coupled to the further enclosure 98d. A second further partition unit 106d of the further aircraft seat device 48d in at least one operating state is provided for visually separating the further aircraft seat region from the further aircraft cabin aisle 34d. The second further partition unit 106d of the further aircraft seat device 48d is configured so as to be adjustable. The further aircraft seat device 48d has direct access to the aircraft cabin aisle 32d. A passenger can directly enter the further aircraft seat region of the further aircraft seat device 48d from the aircraft cabin aisle 32d without traversing another aircraft seat region. The direct access of the further aircraft seat device 48d is assigned only to the further aircraft seat device 48d. The direct access of the further aircraft seat device 48d is utilizable only by the further aircraft seat device 48d.

The further aircraft seat device 48d in a lying position of the further aircraft seat device 48d configures a further lying plane 142d which to at most 60% is implemented by the further aircraft seat 88d of the further aircraft seat device 48d. In the present case, the further lying plane 142d is configured to at most 40% by the further seat base 90d of the further aircraft seat 88d of the further aircraft seat device 48d. The lying plane 140d of the aircraft seat device 46d from the aircraft cabin floor 22d has an identical spacing to the further lying plane 142d of the further aircraft seat device 48d. The further aircraft seat device 48d has two further comfort elements 154d, 156d. A first further comfort element 154d of the further aircraft seat device 48d partially configures a further bed surface. The first further comfort element 154d, when viewed in the further sitting direction 94d, is disposed next to the further seat base 90d of the further aircraft seat 88d. The further lying plane 142d is configured to at least 50% by the first further comfort element 154d of the further aircraft seat device 48d. The first further comfort element 154d is configured so as to be integral to the further seat base 90d of the further aircraft seat 88d of the further aircraft seat device 48d. In the present case, the first further comfort element 154d of the further aircraft seat device 48d is disposed so as to be non-adjustable in the further aircraft seat region of the further aircraft seat device 48d. In principle, it is conceivable that the first further comfort element 154d of the further aircraft seat device 48d protrudes beyond the at least substantially rectangular base area. A second further comfort element 156d of the further aircraft seat device 48d in the lying position partially configures the further bed surface. In the lying position, the second further comfort element 156d, when viewed in the further sitting direction 94d, is disposed directly behind the further seat base 90d of the further aircraft seat 88d. The second further comfort element 156d in the lying position is disposed between the further seat base 90d of the further aircraft seat 88d and the further console 100d. The further lying plane 142d is configured to at least 20% by the second further comfort element 156d of the further aircraft seat device 48d. The second further comfort element 156d is configured so as to be movable in relation to the further seat base 90d of the further aircraft seat 88d. The second further comfort element 156d is configured so as to be movable in relation to the first further comfort element 154d. In principle, it is conceivable that the second further comfort element 156d in the sitting position is stowed between the aircraft cabin floor 22d and the first further comfort element 154d. Alternatively or additionally, it would be conceivable for the second further comfort element 156d in the sitting position to be stowed between the aircraft cabin floor 22d and the further seat base 90d of the further aircraft seat 88d. In principle, it would also be conceivable for the second further comfort element 156d in the sitting position of the further aircraft seat device 48d to be stored at another location in the aircraft cabin 12d. A surface of the further seat base 90d of the further aircraft seat 88d of the further aircraft seat device 48d, a surface of the first further comfort element 154d of the further aircraft seat device 48d, and a surface of the second further comfort element 156d of the further aircraft seat device 48d configure the further lying plane 142d. The surface of the further seat base 90d of the further aircraft seat 88d, the surface of the first further comfort element 154d, and the surface of the second further comfort element 156d in the lying position of the further aircraft seat device 48d face away from the aircraft cabin floor 22d.

The sitting direction 62d of the aircraft seat device 46d is aligned so as to be counter to the further sitting direction 94d of the further aircraft seat device 48d. The sitting direction 62d of the aircraft seat device 46d is configured so as to be at least substantially parallel to the further sitting direction 94d of the further aircraft seat device 48d. The lying direction 64d of the aircraft seat device 46d is aligned so as to be counter to the further lying direction 96d of the further aircraft seat device 48d. The lying direction 64d of the aircraft seat device 46d is configured so as to be at least substantially parallel to the further lying direction 96d of the further aircraft seat device 48d. The lying direction 64d of the aircraft seat device 46d and the further lying direction 96d of the further aircraft seat device 48d are angled in relation to the aircraft cabin central axis 16d at angles of identical values. The lying direction 64d of the aircraft seat device 46d and the further lying direction 96d of the further aircraft seat device 48d are aligned so as to be at least substantially parallel. The lying direction 64d and the further lying direction 96d are aligned in an idealized manner to the aircraft seat device 46d and the further aircraft seat device 48d, wherein an actual lying direction defined by a passenger, preferably by virtue of an asymmetrical posture of the passenger, may deviate from the lying direction 64d and/or from the further lying direction 96d.

A seat central axis of the aircraft seat 56d of the aircraft seat device 46d, which is not illustrated in more detail, is configured so as to be identical to a seat central axis of an adjacent aircraft seat of the adjacent aircraft seat device 46'd, which is not illustrated in more detail. A further seat central axis of the further aircraft seat 88d of the further aircraft seat device 48d, which is not illustrated in more detail, is configured so as to be identical to a further seat central axis of an adjacent further aircraft seat of the adjacent further aircraft seat device 48'd, which is not illustrated in more detail.

An axis perpendicular to the aircraft cabin central axis 16d, which is not illustrated in more detail, intersects the seat base 58d of the aircraft seat 56d of the aircraft seat device 46d and the further seat base 90d of the further aircraft seat 88d of the further aircraft seat device 48d. The axis is aligned so as to be parallel to the aircraft cabin floor 22d. Exactly two seat bases are disposed next to one another in the first seat column 36d, specifically the seat base 58d of the aircraft seat 56d of the aircraft seat device 46d and the further seat base 90d of the further aircraft seat 88d of the further aircraft seat device 48d.

The third seat column 42d is partially illustrated in FIG. 13. The aircraft seat assembly 14d comprises an alternative aircraft seat device 158d. The alternative aircraft seat device 158d is disposed in the third seat column 42d. The alternative aircraft seat device 158d is configured so as to be substantially identical to the aircraft seat device 46d. As opposed to the aircraft seat device 46d in the first seat column 36d, the aircraft seat device 158d in the third seat column 42d is adapted to a shape of the aircraft cabin external wall 20d. The alternative aircraft seat device 158d has an aircraft seat 160d. The aircraft seat 160d comprises a seat base 162d. The aircraft seat 160d comprises a backrest which is not visible. The alternative aircraft seat device 158d in FIGS. 11 and 13 is shown in the sitting position. The alternative aircraft seat device 158d has a sitting direction 164d. The alternative aircraft seat device 158d has a lying direction 166d which for reasons of clarity is illustrated in an adjacent alternative aircraft seat device. The alternative aircraft seat device 158d has an enclosure 168d. The alternative aircraft seat device 158d has a console 170d. The alternative aircraft seat device 158d has a partition wall 172d. The alternative aircraft seat device 158d has at least one alternative comfort element which is not illustrated in more detail. The alternative comfort element has a shape which differs from that of the comfort element of the aircraft seat device 46d. The at least one alternative comfort element is configured so as to be movable in relation to the seat base 162d of the aircraft seat 160d. The alternative aircraft seat device 158d has a foot space which is not illustrated in more detail. The aircraft seat assembly 14d comprises an alternative further aircraft seat device 174d. The alternative further aircraft seat device 174d is disposed in the third seat column 42d. The alternative further aircraft seat device 174d is configured so as to be substantially identical to the further aircraft seat device 48d. As opposed to the further aircraft seat device 48d in the first seat column 36d, the alternative further aircraft seat device 174d in the third seat column 42d is adapted to the aircraft cabin external wall 20d. The alternative further aircraft seat device 174d has a further aircraft seat 176d. The further aircraft seat 176d comprises a further seat base 178d. The further aircraft seat 176d comprises a backrest 180d. The alternative further aircraft seat device 174d in FIGS. 11 and 13 is shown in the sitting position. The alternative further aircraft seat device 174d has a further sitting direction 182d. The alternative further aircraft seat device 174d has a further lying direction 184d which for reasons of clarity is illustrated in an adjacent alternative further aircraft seat device. The alternative further aircraft seat device 174d has a further enclosure 186d. In the present case, the at least one alternative comfort element of the alternative aircraft seat device 158d can be disposed so as to be able to slide and/or fold on the further enclosure 186d of the alternative further aircraft seat device 174d, or on the partition wall 172d of the alternative aircraft seat device 158d. The alternative further aircraft seat device 174d has a further console 188d. The alternative further aircraft seat device 174d has a further partition wall 190d. The alternative further aircraft seat device 174d has a first further comfort element 192d. The first further comfort element 192d is configured so as to be at least substantially identical to the first further comfort element 154d of the further aircraft seat device 48d. The alternative further aircraft seat device 174d has a second further comfort element which is not illustrated in more detail. The second further comfort element is configured so as to be at least substantially identical to the second further comfort element 156d of the further aircraft seat device 48d. The alternative further aircraft seat device 174d has a foot space 194d. The alternative aircraft seat device 158d and the alternative further aircraft seat device 174d have in each case direct access to the same further aircraft cabin aisle 34d.

The second seat column 40d by way of the aircraft cabin central axis 16d is configured as a mirror image of the third seat column 42d. In principle, the aircraft seat assembly 14d illustrated in FIG. 11 is not limited to the number of aircraft seat devices shown. The aircraft seat assembly 14d here can have fewer or more than the aircraft seat devices illustrated. In principle, it would also be conceivable for the aircraft seat assembly 14d shown in FIG. 11 entirely or partially, preferably at least one of the seat columns 36d, 40d, 42d, to be disposed so as to be mirror-imaged about an axis in the aircraft cabin 12d, wherein the axis is aligned so as to be perpendicular to the aircraft cabin central axis 16d and parallel to the aircraft cabin floor 22d.

The invention claimed is:

1. An aircraft seat assembly having at least one aircraft seat device and having at least one further aircraft seat device which are disposed at least partially next to each other in at least one common seat column and wherein each aircraft seat device of the at least one aircraft seat device and at least one further aircraft seat device is adjustable between a sitting position and a lying position, wherein a lying direction of the at least one aircraft seat device is aligned counter to a further lying direction of the at least one further aircraft seat device, wherein the at least one aircraft seat device has at least one enclosure which is configured as a shell, and in the lying position of the at least one aircraft seat device the shell at least substantially covers a head region of an aircraft seat of the at least one aircraft seat device.

2. The aircraft seat assembly as claimed in claim 1, wherein each aircraft seat device of the at least one aircraft seat device and the at least one further aircraft seat device has direct access to an aircraft cabin aisle.

3. The aircraft seat assembly as claimed in claim 1 wherein each aircraft seat device of the at least one aircraft seat device and the at least one further aircraft seat device has direct access to different aircraft cabin aisles.

4. The aircraft seat assembly as claimed in claim 1, wherein the lying direction of the at least one aircraft seat device has a vector in a flight direction, and the further lying direction of the at least one further aircraft seat device has a vector counter to the flight direction.

5. The aircraft seat assembly as claimed in claim 1, wherein the lying direction of the at least one aircraft seat device, and the further lying direction of the at least one further aircraft seat device are aligned angled by at least 5 degrees in relation to an aircraft longitudinal axis.

6. The aircraft seat assembly as claimed in claim 1, wherein the lying direction of the at least one aircraft seat device, and the further lying direction of the at least one further aircraft seat device are aligned at least substantially parallel.

7. The aircraft seat assembly as claimed in claim 1, wherein the at least one aircraft seat device at least partially intersects an aircraft cabin central plane.

8. The aircraft seat assembly as claimed in claim 1, further comprising at least three seat groups which are disposed directly behind each other in the at least one seat column and each three seat group of the at least three seat groups is formed from the at least one aircraft seat device and the at least one further aircraft seat device.

9. The aircraft seat device as claimed in claim 1, wherein an axis perpendicular to an aircraft longitudinal axis, in the lying position of the at least one aircraft seat device and of the at least one further aircraft seat device, intersects a shoulder region of the at least one aircraft seat device and a further shoulder region of the at least one further aircraft seat device.

10. The aircraft seat assembly as claimed in claim 1, wherein an axis perpendicular to an aircraft longitudinal axis, in the sitting position of the at least one aircraft seat device and of the at least one further aircraft seat device, intersects a backrest of an aircraft seat of the at least one aircraft seat device and a further backrest of a further aircraft seat of the at least one further aircraft seat device.

11. The aircraft seat assembly as claimed in claim 1, wherein, when viewed perpendicularly to an aircraft cabin floor, a seat central axis of an aircraft seat of the at least one aircraft seat device intersects a seat base of a further aircraft seat of the at least one further aircraft seat device.

12. The aircraft seat assembly as claimed in claim 1, wherein the lying direction of the at least one aircraft seat device, and the further lying direction of the at least one further aircraft seat device are directed toward each other.

13. The aircraft seat assembly as claimed in claim 1, wherein the at least one aircraft seat device in the lying position of the at least one aircraft seat device implements a lying plane which has a first spacing from an aircraft cabin floor, and the at least one further aircraft seat device in the lying position of the at least one further aircraft seat device implements a second spacing from the aircraft cabin floor, the first spacing is different from the second spacing.

14. The aircraft seat assembly as claimed in claim 1, wherein a foot space of the at least one aircraft seat device, and a further foot space of the at least one further aircraft seat device, when viewed perpendicularly to an aircraft cabin floor, are disposed so as to overlap.

15. The aircraft seat assembly as claimed in claim 1, wherein the at least one aircraft seat device and the at least one further aircraft seat device have at least one common console.

16. The aircraft seat assembly as claimed in claim 15, further comprising at least one adjacent aircraft seat device which is configured at least substantially identical to the at least one aircraft seat device, wherein the at least one console is at least partially utilized from the at least one adjacent aircraft seat device.

17. The aircraft seat assembly as claimed in claim 1, wherein the at least one aircraft seat device and the at least one further aircraft seat device conjointly implement an at least substantially rectangular base area.

18. The aircraft seat assembly as claimed in claim 1, wherein a sitting direction of the at least one aircraft seat device is aligned at least substantially parallel to an aircraft longitudinal axis.

19. The aircraft seat assembly as claimed in claim 1, wherein an axis perpendicular to an aircraft longitudinal axis, in the sitting position of the at least one aircraft seat device and of the at least one further aircraft seat device, intersects a seat base of an aircraft seat of the at least one aircraft seat device, and a further seat base of a further aircraft seat of the at least one further aircraft seat device.

20. The aircraft seat assembly as claimed in claim 1, wherein the at least one aircraft seat device in a lying position of the at least one aircraft seat device implements a lying plane which to at most 60% is implemented by an aircraft seat of the at least one aircraft seat device.

21. An aircraft cabin comprising:
at least one aircraft cabin portion; and
the aircraft seat assembly as claimed in claim 1, disposed in the at least one aircraft cabin portion.

22. An aircraft seat assembly having at least one aircraft seat device and having at least one further aircraft seat device which are disposed at least partially next to each other in at least one common seat column and wherein each aircraft seat device of the at least one aircraft seat device and at least one further aircraft seat device is adjustable between a sitting position and a lying position, wherein a lying direction of the at least one aircraft seat device is aligned counter to a further lying direction of the at least one further aircraft seat device, wherein the at least one aircraft seat device has at least one enclosure which is configured as a shell, and in the lying position of the at least one aircraft seat device the shell at least substantially covers a head region of an aircraft seat of the at least one aircraft seat device, wherein the at least one enclosure has a flat region which is inclined and which overlaps the head region of the aircraft seat of the at least one aircraft seat device in the lying position.

* * * * *